(12) United States Patent
Takiguchi et al.

(10) Patent No.: US 9,240,707 B2
(45) Date of Patent: Jan. 19, 2016

(54) ROTARY ELECTRIC MACHINE

(75) Inventors: Ryuichi Takiguchi, Chiyoda-ku (JP);
Yuji Takizawa, Chiyoda-ku (JP); Yu Hirotani, Chiyoda-ku (JP); Satoru Akutsu, Chiyoda-ku (JP); Masatsugu Nakano, Chiyoda-ku (JP); Tetsuya Iwata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 591 days.

(21) Appl. No.: 13/611,402

(22) Filed: Sep. 12, 2012

(65) Prior Publication Data

US 2013/0187510 A1 Jul. 25, 2013

(30) Foreign Application Priority Data

Jan. 23, 2012 (JP) ................................. 2012-010964

(51) Int. Cl.
*H02K 3/12* (2006.01)
*H02K 3/28* (2006.01)

(52) U.S. Cl.
CPC ... *H02K 3/12* (2013.01); *H02K 3/28* (2013.01)

(58) Field of Classification Search
CPC .................................. H02K 3/12; H02K 3/28
USPC ......................................... 310/207, 263, 114
See application file for complete search history.

(56) References Cited

U.S. PATENT DOCUMENTS

| 6,703,750 | B2 * | 3/2004 | Nakamura | 310/184 |
| 6,825,589 | B2 * | 11/2004 | Kouda et al. | 310/207 |
| 6,943,477 | B1 * | 9/2005 | Nakamura | 310/184 |
| 6,979,926 | B2 * | 12/2005 | Ogawa et al. | 310/180 |
| 6,995,492 | B1 * | 2/2006 | Kouda et al. | 310/254.1 |
| 7,417,355 | B2 * | 8/2008 | Shichijo et al. | 310/263 |
| 8,283,831 | B1 * | 10/2012 | Kaminsky et al. | 310/198 |
| 2003/0233748 | A1 * | 12/2003 | Gorohata et al. | 29/596 |

(Continued)

FOREIGN PATENT DOCUMENTS

| DE | 103 31 262 A1 | 2/2004 |
| DE | 10 2006 032 791 A1 | 1/2007 |
| JP | 11-346448 A | 12/1999 |
| JP | 2001-211584 A | 8/2001 |
| JP | 2002-247787 A | 8/2002 |
| JP | 2002-281706 A | 9/2002 |
| JP | 2003-134711 A | 5/2003 |

OTHER PUBLICATIONS

German Office Action, dated Jul. 4, 2014, Application No. 10-2012 220 162.9.

(Continued)

*Primary Examiner* — Alex W Mok
(74) *Attorney, Agent, or Firm* — Sughrue Mion, PLLC; Richard C. Turner

(57) ABSTRACT

A coil is configured so that: N conductor wires of wave windings each divided at at least two positions in a circumferential direction are provided in one of a plurality of slots; within a unit of the divided wave windings in which conduction is made, the N conductor wires are connected in one of series and parallel to each other at division positions located at substantially the same circumferential position of conductor-wire end portions; division units of the divided wave windings are connected in series to each other, and a total number of series turns of the series-connected division units of the each phase is a predetermined number of series turns, which does not exceed an upper limit value of a terminal voltage of the rotary electric machine; and the series-connected division units of the each phase have the same total number of series turns.

20 Claims, 18 Drawing Sheets

(56) References Cited

U.S. PATENT DOCUMENTS

| | | |
|---|---|---|
| 2005/0082923 A1 | 4/2005 | Akita et al. |
| 2005/0212372 A1 | 9/2005 | Akita et al. |
| 2006/0220477 A1* | 10/2006 | Okumoto et al. ............... 310/58 |
| 2011/0043069 A1* | 2/2011 | Tanaka et al. ................. 310/198 |
| 2011/0101906 A1* | 5/2011 | Tagome ........................ 318/722 |

OTHER PUBLICATIONS

Japanese Office Action (Preliminary Notice of Reasons for Rejection), Nov. 12, 2013, Application No. 2012-010964.

* cited by examiner

| NUMBER OF SLOTS | Q1= | 9 | N1 | | | | | |
|---|---|---|---|---|---|---|---|---|
| | | | 1 | 2 | 3 | 4 | 5 | 6 |
| | Q2= | 1 | Q1 × N1/2 | | | | | |
| N2 | | Q2 × N2/2 | 4.5 | 9.0 | 13.5 | 18.0 | 22.5 | 27.0 |
| | 1 | 0.5 | 5.0 | 9.5 | 14.0 | 18.5 | 23.0 | 27.5 |
| | 2 | 1.0 | 5.5 | 10.0 | 14.5 | 19.0 | 23.5 | 28.0 |
| | 3 | 1.5 | 6.0 | 10.5 | 15.0 | 19.5 | 24.0 | 28.5 |
| | 4 | 2.0 | 6.5 | 11.0 | 15.5 | 20.0 | 24.5 | 29.0 |
| | 5 | 2.5 | 7.0 | 11.5 | 16.0 | 20.5 | 25.0 | 29.5 |
| | 6 | 3.0 | 7.5 | 12.0 | 16.5 | 21.0 | 25.5 | 30.0 |

| NUMBER OF SLOTS | Q1= | 8 | N1 | | | | | |
|---|---|---|---|---|---|---|---|---|
| | | | 1 | 2 | 3 | 4 | 5 | 6 |
| | Q2= | 2 | Q1 × N1/2 | | | | | |
| N2 | | Q2 × N2/2 | 4.0 | 8.0 | 12.0 | 16.0 | 20.0 | 24.0 |
| | 1 | 1.0 | 5.0 | 9.0 | 13.0 | 17.0 | 21.0 | 25.0 |
| | 2 | 2.0 | 6.0 | 10.0 | 14.0 | 18.0 | 22.0 | 26.0 |
| | 3 | 3.0 | 7.0 | 11.0 | 15.0 | 19.0 | 23.0 | 27.0 |
| | 4 | 4.0 | 8.0 | 12.0 | 16.0 | 20.0 | 24.0 | 28.0 |
| | 5 | 5.0 | 9.0 | 13.0 | 17.0 | 21.0 | 25.0 | 29.0 |
| | 6 | 6.0 | 10.0 | 14.0 | 18.0 | 22.0 | 26.0 | 30.0 |

| NUMBER OF | Q1= | 7 | N1 | | | | | |
|---|---|---|---|---|---|---|---|---|
| | | | 1 | 2 | 3 | 4 | 5 | 6 |
| SLOTS | Q2= | 3 | Q1 × N1/2 | | | | | |
| N2 | | Q2 × N2/2 | 3.5 | 7.0 | 10.5 | 14.0 | 17.5 | 21.0 |
| | 1 | 1.5 | 5.0 | 8.5 | 12.0 | 15.5 | 19.0 | 22.5 |
| | 2 | 3.0 | 6.5 | 10.0 | 13.5 | 17.0 | 20.5 | 24.0 |
| | 3 | 4.5 | 8.0 | 11.5 | 15.0 | 18.5 | 22.0 | 25.5 |
| | 4 | 6.0 | 9.5 | 13.0 | 16.5 | 20.0 | 23.5 | 27.0 |
| | 5 | 7.5 | 11.0 | 14.5 | 18.0 | 21.5 | 25.0 | 28.5 |
| | 6 | 9.0 | 12.5 | 16.0 | 19.5 | 23.0 | 26.5 | 30.0 |

| | | N1 | | | | | | |
|---|---|---|---|---|---|---|---|---|
| NUMBER OF SLOTS | Q1= | 6 | 1 | 2 | 3 | 4 | 5 | 6 |
| | Q2= | 4 | Q1 × N1/2 | | | | | |
| N2 | | Q2 × N2/2 | 3.0 | 6.0 | 9.0 | 12.0 | 15.0 | 18.0 |
| | 1 | 2.0 | 5.0 | 8.0 | 11.0 | 14.0 | 17.0 | 20.0 |
| | 2 | 4.0 | 7.0 | 10.0 | 13.0 | 16.0 | 19.0 | 22.0 |
| | 3 | 6.0 | 9.0 | 12.0 | 15.0 | 18.0 | 21.0 | 24.0 |
| | 4 | 8.0 | 11.0 | 14.0 | 17.0 | 20.0 | 23.0 | 26.0 |
| | 5 | 10.0 | 13.0 | 16.0 | 19.0 | 22.0 | 25.0 | 28.0 |
| | 6 | 12.0 | 15.0 | 18.0 | 21.0 | 24.0 | 27.0 | 30.0 |

| | | N1 | | | | | |
|---|---|---|---|---|---|---|---|
| NUMBER OF SLOTS | Q1= 5 | 1 | 2 | 3 | 4 | 5 | 6 |
| | Q2= 5 | Q1 × N1/2 | | | | | |
| N2 | Q2 × N2/2 | 2.5 | 5.0 | 7.5 | 10.0 | 12.5 | 15.0 |
| 1 | 2.5 | 5.0 | 7.5 | 10.0 | 12.5 | 15.0 | 17.5 |
| 2 | 5.0 | 7.5 | 10.0 | 12.5 | 15.0 | 17.5 | 20.0 |
| 3 | 7.5 | 10.0 | 12.5 | 15.0 | 17.5 | 20.0 | 22.5 |
| 4 | 10.0 | 12.5 | 15.0 | 17.5 | 20.0 | 22.5 | 25.0 |
| 5 | 12.5 | 15.0 | 17.5 | 20.0 | 22.5 | 25.0 | 27.5 |
| 6 | 15.0 | 17.5 | 20.0 | 22.5 | 25.0 | 27.5 | 30.0 |

| NUMBER OF SLOTS | Q1= | 10 | N1 | | | | | |
|---|---|---|---|---|---|---|---|---|
| | | | 1 | 2 | 3 | 4 | 5 | 6 |
| | Q2= | 0 | Q1 × N1/2 | | | | | |
| N2 | | Q2 × N2/2 | 5.0 | 10.0 | 15.0 | 20.0 | 25.0 | 30.0 |
| | 1 | 0.0 | 5.0 | 10.0 | 15.0 | 20.0 | 25.0 | 30.0 |
| | 2 | 0.0 | 5.0 | 10.0 | 15.0 | 20.0 | 25.0 | 30.0 |
| | 3 | 0.0 | 5.0 | 10.0 | 15.0 | 20.0 | 25.0 | 30.0 |
| | 4 | 0.0 | 5.0 | 10.0 | 15.0 | 20.0 | 25.0 | 30.0 |
| | 5 | 0.0 | 5.0 | 10.0 | 15.0 | 20.0 | 25.0 | 30.0 |
| | 6 | 0.0 | 5.0 | 10.0 | 15.0 | 20.0 | 25.0 | 30.0 |

FIRST DIVISION POSITION   SECOND DIVISION POSITION   FIRST DIVISION POSITION

ROTARY ELECTRIC MACHINE

BACKGROUND OF THE INVENTION

1. Field of the Invention

The present invention relates to a rotary electric machine, and more particularly, to a structure of a stator of a rotary electric machine.

2. Description of the Related Art

A stator of a rotary electric machine includes a stator core provided with slots, a coil mounted to the stator core, and an insulator, which is mounted in each slot, for insulating the coil from the stator core.

Further, examples of the stator core include a cylindrical member formed by stacking thin steel plates in an overlapping state, and in which a plurality of slots extending in a central axis direction are provided in a circumferential direction at predetermined pitches so as to be opened to an inner peripheral side of the stator core.

Moreover, there has been proposed a stator core in which, when the coil is mounted to the stator core, the stator core is developed into a linear shape so that a gap at the slot becomes larger than a wire width of a coil conductor, which enables mounting of a conductor having a large wire width. In such a stator core, after the coil is mounted, both ends of the linear stator core are brought into abutment to each other to form an annular shape, and both the ends are jointed to each other by welding or the like.

Note that, as for the shape of the coil, there has been proposed a coil having a structure in which, on an outer side of an axial end surface of the stator core, coil ends of a conductor wire for use in the coil are bent back to be wave-wound. Moreover, there has been proposed another structure in which, in order to efficiently use a space of the slots in the above-mentioned structure, two sets of coils are mounted for each predetermined number of slots so that a set of two conductor wires alternately occupy an inner layer side and an outer layer side in a slot depth direction, and thus the coils are distributed and wound into six phases (see, for example, Japanese Patent Application Laid-open No. 2001-211584).

However, the performance of the rotary electric machine is significantly affected by the number of turns of the coil, and hence when the number of turns is limited, a performance design appropriate for the intended use cannot be done.

For example, in a case where the rotary electric machine is used as an AC generator for an automobile, when a relationship between an output current of the generator and an rpm of an engine, which is proportional to an rpm of a rotor, is considered, in a generator having a larger number of turns of the coil, an output current at low speed becomes lower and an output current at high speed becomes higher as compared to a generator having a smaller number of turns of the coil.

That is, although there are various needs in view of the balance in output current between at low speed and at high speed, because the number of coils in a slot is specified and the number of turns of the coil is an integer, there has been a problem in that the above-mentioned needs cannot be satisfied in some cases.

In order to solve such a problem, there has been proposed a structure in which Δ-connection of coils of integer turns and Y-connection of coils of integer turns are combined. In this structure, of two sets of three-phase coils of integer turns, one set of the three-phase coil is Δ-connected, and another set of the three-phase coil is connected to wire-connection portions of the Δ-connection. Thus, the two sets of the three-phase coils are arranged at slot positions to be in a state of being shifted by π/6 electrical angle from each other.

According to this structure, even when the number of turns of the two sets of the three-phase coils is an integer, the number of turns in a wire-connection state of the Δ-connection and the Y-connection can be the number of turns between integers (non-integer turn number) (see, for example, Japanese Patent Application Laid-open No. 2002-247787).

Further, as another method to solve the problem, there has been proposed a structure in which, in a rotary electric machine including a stator including a multi-phase winding formed of a plurality of phase windings, one end of one of the phase windings is connected to a middle point other than both ends of another of the phase windings in a cyclic manner among the plurality of phase windings.

In this structure, in a part at which the phase windings are connected to each other (a part from the one end to the middle point of each phase winding), it may be considered that Δ-connection is made by a plurality of phase windings. Further, in a part other than the above-mentioned part of the phase windings (a part from the middle point to another end of each phase winding), it may be considered that a part of Y-connected phase windings is connected in series to each wire-connection portion of the Δ-connection.

According to this structure, the windings connected in Δ-connection are substantially equivalent to windings connected in Y-connection having the number of turns multiplied by $1/\sqrt{3}$. Therefore, the number of turns of the multi-phase winding in conversion with that of Y-connection is equivalent to the number of turns of Y-connection portion added with the number of turns obtained by multiplying the number of turns of the Δ-connection portion by $1/\sqrt{3}$. Therefore, by only changing a position of the middle point connected with two of the phase windings, a ratio of number of turns of the Y-connection portion to the Δ-connection portion can be changed at small intervals (see, for example, Japanese Patent Application Laid-open No. 2002-281706).

However, the conventional technologies have the following problems.

When the rotary electric machine described in Japanese Patent Application Laid-open No. 2002-247787 is used as an AC generator for an automobile, in order to change the number of turns of the stator winding, the number of conductors to be housed in the slot of the stator is required to be changed, and hence the number of turns can only be changed in the range of integers. Therefore, the output characteristics discretely vary in accordance with the change of the number of turns in the range of integers. Thus, the desired output characteristics may not be obtained, and there is a problem in that the degree of freedom in design of the output characteristics is low.

In contrast, it is conceivable to employ a method of substantially setting the number of turns of the stator winding to a value other than an integer by reducing the number of conductors to be housed in a part of the slots of the stator. However, in this case, in the slot at which the number of conductors to be housed is reduced, the conductor filling factor is reduced to increase the gap inside the slot. Therefore, the conductors may easily vibrate, which may easily cause short circuit between the wires or between the wire and an inner wall of the slot. Thus, there arises a new problem in that the reliability of the AC generator is deteriorated.

Further, in the case where the number of the conductors to be housed is reduced only in a part of slots of the stator, as compared to a case where the stator winding is equally wound with respect to all of the slots, the manufacturing facility becomes more complicated, and there also arises a problem of cost increase.

Further, the rotary electric machine of Japanese Patent Application Laid-open No. 2002-281706 requires two sets of three-phase coils. Further, the number of turns of each of the two sets of the three-phase coils is an integer. Therefore, there is a problem in that the non-integer turn number cannot be freely obtained in a wire-connection state of the Δ-connection and the Y-connection.

Moreover, in a case where the rotary electric machine of Japanese Patent Application Laid-open No. 2002-281706 is used as an AC generator for an automobile, when the stator winding is formed by jointing electric conductors bent into a U-shape, in addition to the above-mentioned problems, it becomes difficult to change the number of turns of the stator winding itself, and there is also a problem in that it is practically impossible to change the output characteristics.

That is, for example, it is possible to change the number of electric conductors housed in each slot of the stator, but in accordance therewith, the number of connecting portions and the number of bending times of the electric conductors change. Therefore, it is necessary to significantly change the manufacturing facility, which causes significant increase in cost due to the complicated manufacturing facility.

SUMMARY OF THE INVENTION

The present invention has been made to solve the above-mentioned problems, and it is an object thereof to obtain a rotary electric machine including a stator having a winding structure capable of achieving wider choices of the number of series turns.

According to the present invention, there is provided a rotary electric machine, including: a stator including three-phase AC windings; and a field pole rotor, in which the stator includes: a stator core provided with a plurality of slots arranged in a circumferential direction at predetermined pitches; and a coil of each phase, which includes N conductor wires, where N is a positive integer of 2 or more, which are bent back on an outer side of an axial end surface of the stator core, the coil being mounted in the plurality of slots at predetermined slot pitches, and the coil is configured so that: the N conductor wires of wave windings each divided at at least two positions in the circumferential direction are provided in one of the plurality of slots; within a unit of the divided wave windings in which conduction is made, the N conductor wires are connected in one of series and parallel to each other at division positions located at substantially the same circumferential position of conductor-wire end portions; in the each phase, division units of the divided wave windings are connected in series to each other, and a total number of series turns of the series-connected division units of the each phase is a predetermined number of series turns, which does not exceed an upper limit value of a terminal voltage of the rotary electric machine; and the series-connected division units of the each phase have the same total number of series turns.

According to the rotary electric machine of the present invention, the coil is configured so that: the N conductor wires of the wave windings each divided at the at least two positions in the circumferential direction are provided in the one of the plurality of slots; within the unit of the divided wave windings in which the conduction is made, the N conductor wires are connected in the one of series and parallel to each other at the division positions located at substantially the same circumferential position of the conductor-wire end portions; in the each phase, the division units of the divided wave windings are connected in series to each other, and the total number of series turns of the series-connected division units of the each phase is the predetermined number of series turns, which does not exceed the upper limit value of the terminal voltage of the rotary electric machine; and the series-connected division units of the each phase have the same total number of series turns.

As a result, without changing the number of conductor wires per slot, the number of turns can be changed merely by the wire-connection method. With this, wider choices of the number of series turns can be achieved, and hence it is possible to increase the degree of freedom in design of the number of series turns of the rotary electric machine in accordance with the required specification without increasing copper loss of the rotary electric machine.

DETAILED DESCRIPTION OF THE PREFERRED EMBODIMENTS

Hereinafter, a rotary electric machine according to each exemplary embodiment of the present invention is described with reference to the drawings. In the respective drawings, the same or corresponding parts are denoted by the same reference symbols.

First Embodiment

Figure 1:
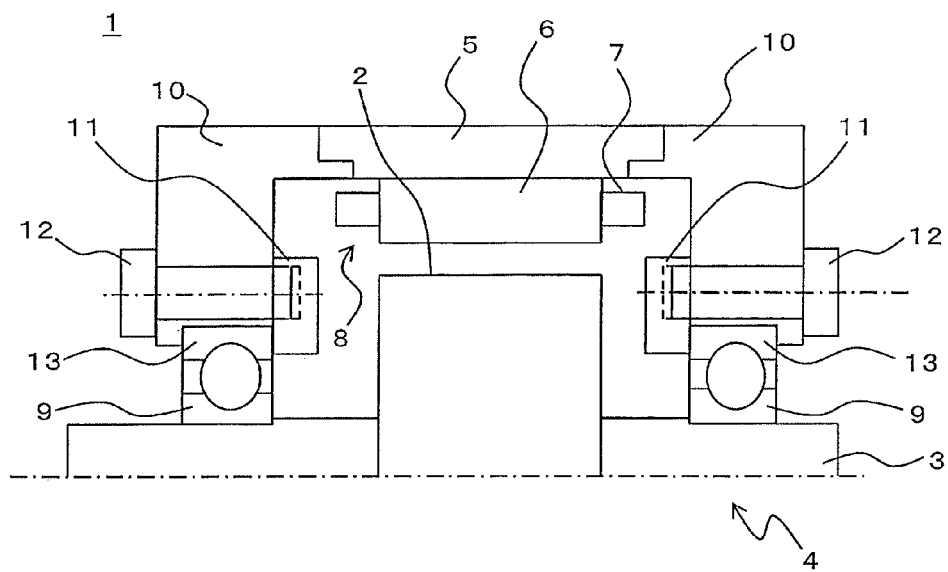
FIG. 1 is a sectional view of an upper half part of a rotary electric machine according to a first embodiment of the present invention including a shaft thereof.

FIG. 1 is a sectional view of an upper half part of a rotary electric machine according to a first embodiment of the present invention including a shaft thereof. In FIG. 1, a rotary electric machine 1 includes a field pole rotor 4 including a magnetic body 2 serving as a rotor core and a shaft 3, a stator 8 including a stator core 6 fixed to a frame 5 and a coil 7 mounted to the stator core 6, a bearing 9, a bracket 10, a bearing fixing screw 12 for fixing an endplate 11, and the endplate 11 for fixing a side surface of a bearing outer race 13.

Figure 2:
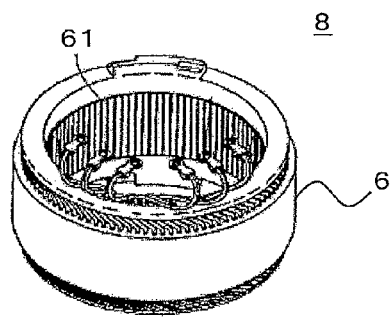
FIG. 2 is a perspective view illustrating a stator taken out from the rotary electric machine illustrated in FIG. 1.

FIG. 2 is a perspective view illustrating the stator 8 taken out from the rotary electric machine 1 illustrated in FIG. 1. In FIG. 2, the stator 8 includes the stator core 6 formed by stacking thin steel plates in an overlapping state, and the coil 7 mounted to a plurality of slots 61 extending in a central axis direction, which are provided in a circumferential direction at predetermined pitches so as to be opened to an inner peripheral side of the stator core 6.

Figure 3:
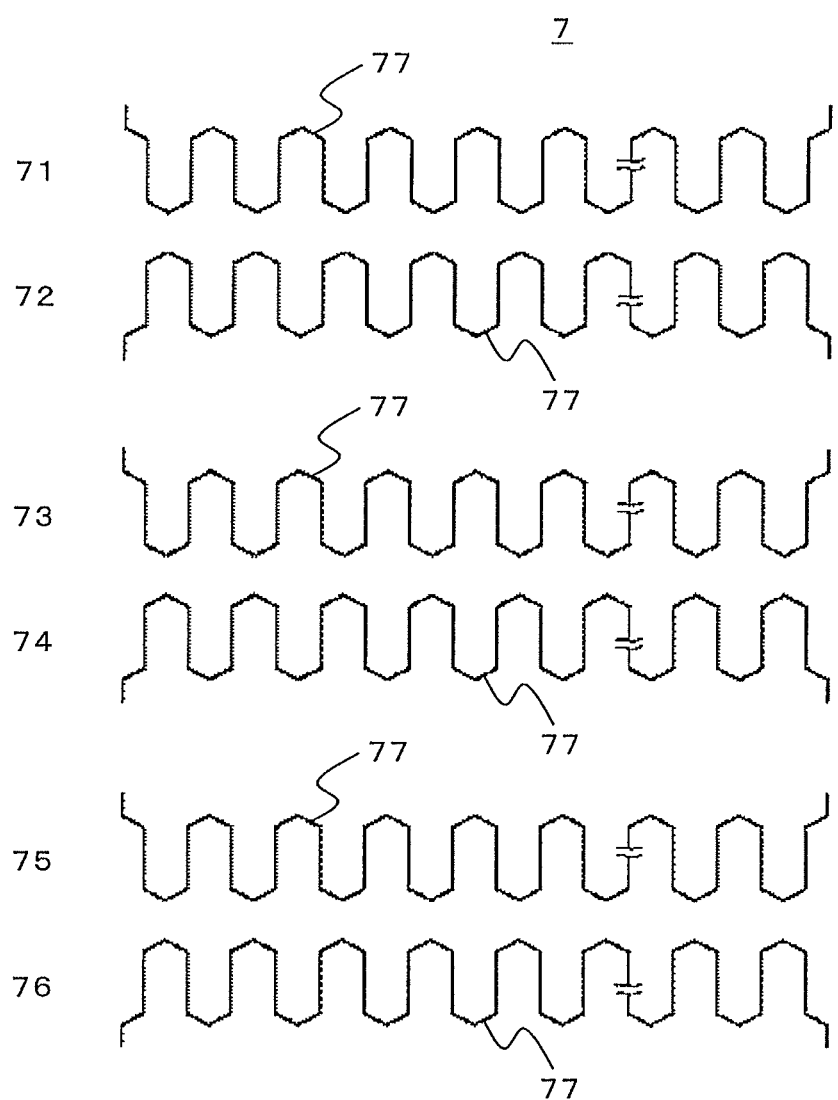
FIG. 3 is a plan view illustrating a shape of a coil illustrated in FIG. 2.

FIG. 3 is a plan view illustrating a shape of the coil 7 illustrated in FIG. 2. In FIG. 3, the coil 7 has a structure in which, on an outer side of an axial end surface of the stator core 6 (end portion of lines erected in the up-down direction of FIG. 3), coil ends 77 are bent back to be wave-wound. The coil 7 includes respective pairs of a first conductor wire 71 and a second conductor wire 72, a third conductor wire 73 and a fourth conductor wire 74, and a fifth conductor wire 75 and a sixth conductor wire 76, which are mounted in the slots 61.

Figure 4:
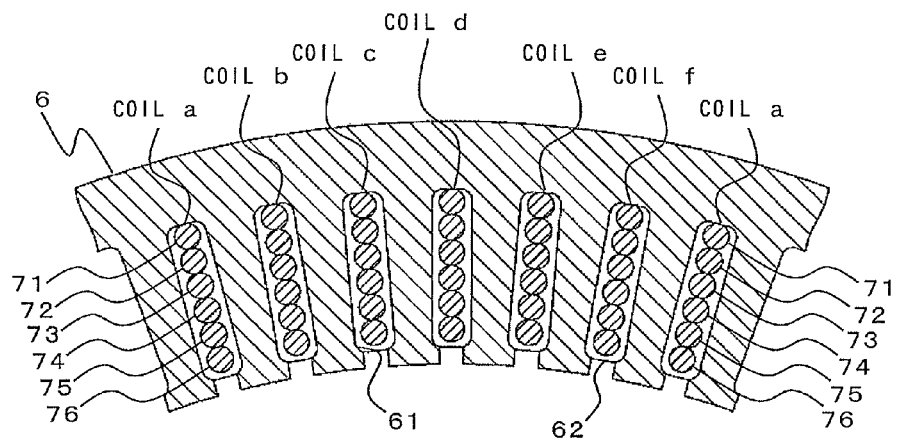
FIG. 4 is a sectional view illustrating a state in which a plurality of pairs of conductor wires are mounted inside slots of the stator core illustrated in FIG. 2.

FIG. 4 is a sectional view illustrating a state in which a plurality of pairs of conductor wires are mounted in the slots 61 of the stator core 6 illustrated in FIG. 2. In FIG. 4, in order to efficiently use a space, a pair of the first conductor wire 71 and the second conductor wire 72 is mounted through intermediation of insulating paper 62 etc. at a predetermined slot pitch (in FIG. 4, the first slot is followed by the fourth slot) so as to alternately occupy an inner layer side and an outer layer side in a depth direction of the slot 61.

Other pairs of the third conductor wire 73 and the fourth conductor wire 74, and the fifth conductor wire 75 and the sixth conductor wire 76 are similarly mounted at predetermined slot pitches so as to alternately occupy the inner layer side and the outer layer side, and thus a coil a is formed. Further, similarly, conductor wires forming coils b, c, d, e, and f of the remaining phases are mounted at predetermined slot pitches. In this case, the coils a and d are taken as U phase, the coils b and e are taken as V phase, and the coils c and f are taken as W phase.

That is, a three-phase AC winding is formed by the first conductor wire 71 and the second conductor wire 72, the third conductor wire 73 and the fourth conductor wire 74, and the fifth conductor wire 75 and the sixth conductor wire 76. As described above, the coil 7 is mounted in the slots 61 at a predetermined slot pitch in such a manner that long conductor wires are bent back on the outer side of the end surface of the stator core 6, and thus a so-called regular winding in which the coil ends 77 are arrayed can be obtained.

Figure 5:
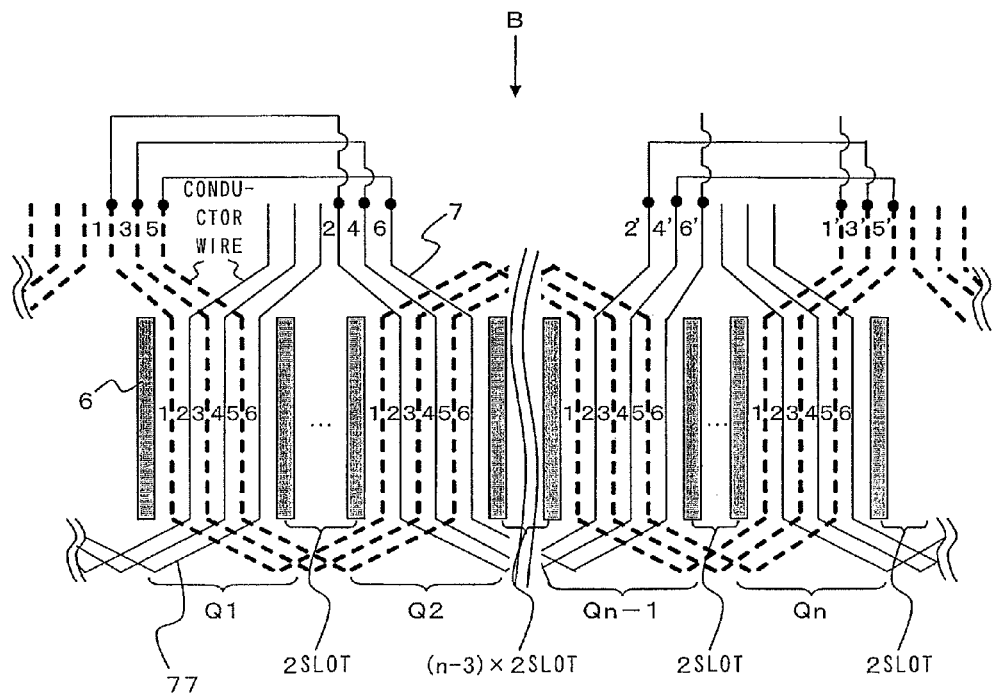
FIG. 5 is a diagram as viewed from a direction of the arrow A of FIG. 4.

FIG. 5 is a diagram as viewed from a direction of the arrow A of FIG. 4. In FIG. 5, six conductor wires forming a coil of a certain phase include the respective pairs of the first conductor wire 71 (1, 1' of FIG. 5) and the second conductor wire 72 (2, 2' of FIG. 5), the third conductor wire 73 (3, 3' of FIG. 5) and the fourth conductor wire 74 (4, 4' of FIG. 5), and the fifth conductor wire 75 (5, 5' of FIG. 5) and the sixth conductor wire 76 (6, 6' of FIG. 5). At respective axial end surfaces of the stator core 6, the coil ends 77 of each pair, which are located on opposite sides but at substantially the same circumferential position, are bent back. Under this state, the six conductor wires are mounted from slots Q1 to Qn.

Note that, FIG. 5 does not illustrate the structure between the slots Q2 and Qn-1, but in the slots in the lateral direction, conductor wires and slots of other phases are present. Further, for example, the coil ends 77, which are present at one axial end surface, of the conductor wires forming a pair, for example, the first conductor wire 71 and the second conductor wire 72, which are mounted in the slots, are divided at a position circumferentially shifted by the slot pitch.

Further, this one divided conductor wire and the other divided conductor wire are connected to each other by brazing and the like. In the rotary electric machine 1 of FIG. 5, the number of slots is 30 as a whole, and FIG. 5 illustrates a division unit of the wave windings provided in a part of the 30 slots, that is, Qn slots of a certain phase.

Figure 6:
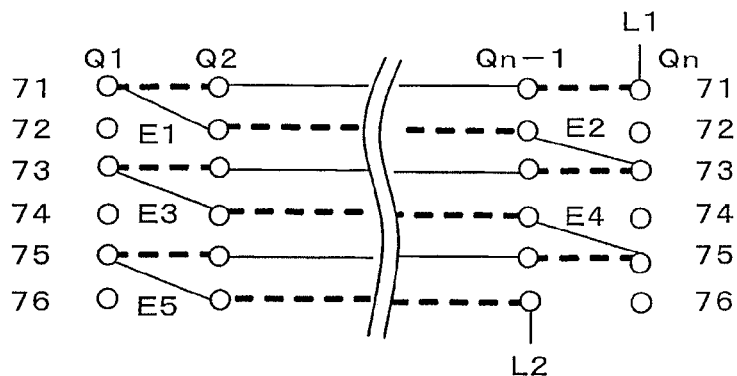
FIG. 6 is a schematic diagram illustrating wire connection in a division unit of a diagram as viewed from a direction of the arrow B of FIG. 5, when the number of series conductor wires is 6.

FIG. 6 is a schematic diagram illustrating wire connection in a division unit of a diagram as viewed from a direction of the arrow B of FIG. 5, when the number of series conductor wires is 6. In FIG. 6, a circle indicates a conductor wire arranged in the slot (in FIG. 3, line erected in the up-down direction of FIG. 3), and the circles located in the vertically identical position represent that the conductor wires are mounted in the same slot. Further, reference symbols indicated above the circles matches with the slot numbers of FIG. 5, and FIG. 6 is a diagram in which the annularly arranged slots are developed into a linear state.

Further, the solid line connecting the circles indicates the coil end 77 at one axial end portion of the stator core 6, and a lead wire on the coil end 77 side. The broken line connecting the circles indicates the coil end 77 at another axial end portion of the stator core 6.

Note that, although not illustrated similarly to FIG. 5, between the circles in the lateral direction, conductor wires and slots of other phases are present. FIG. 6 illustrates a division unit of a part of the 30 slots provided in the entire rotary electric machine 1, that is, Qn slots of a certain phase.

Further, in FIG. 6, in the coil of a certain phase, each of respective terminals of the slots Qn and Qn-1 of the first conductor wire 71 and the sixth conductor wire 76 is set as a high voltage side or a low voltage side, and any one of a high voltage side or a low voltage side of terminals of another division unit is connected to the terminal of the division unit illustrated in FIG. 6 so as to be connected in series thereto. Further, the following positions are respectively connected.

lead wire L1: terminal of slot Qn of first conductor wire 71
coil end E1: between slot Q1 of first conductor wire 71 and slot Q2 of second conductor wire 72
coil end E2: between slot Qn-1 of second conductor wire 72 and slot Qn of third conductor wire 73
coil end E3: between slot Q1 of third conductor wire 73 and slot Q2 of fourth conductor wire 74
coil end E4: between slot Qn-1 of fourth conductor wire 74 and slot Qn of fifth conductor wire 75
coil end E5: between slot Q1 of fifth conductor wire 75 and slot Q2 of sixth conductor wire 76
lead wire L2: terminal of slot Qn-1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 6)/2.

Figure 7:
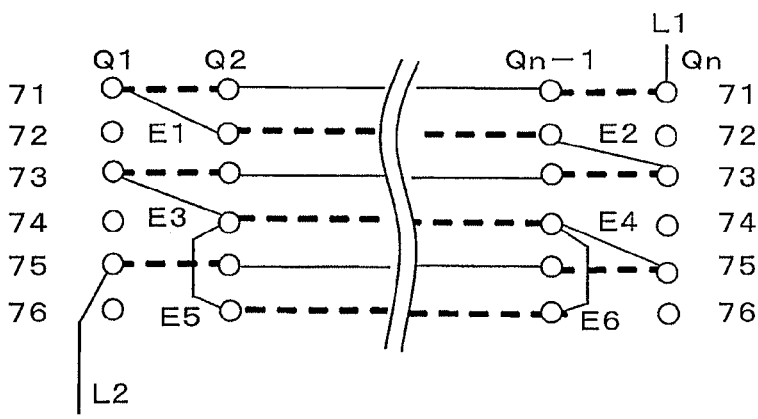
FIG. 7 is a schematic diagram illustrating wire connection in the division unit of the diagram as viewed from the direction of the arrow B of FIG. 5, when the number of series conductor wires is 5.

FIG. 7 is a schematic diagram illustrating wire connection in the division unit of the diagram as viewed from the direction of the arrow B of FIG. 5, when the number of series conductor wires is 5. In FIG. 7, the following positions are respectively connected.

lead wire L1: terminal of slot Qn of first conductor wire 71
coil end E1: between slot Q1 of first conductor wire 71 and slot Q2 of second conductor wire 72
coil end E2: between slot Qn-1 of second conductor wire 72 and slot Qn of third conductor wire 73
coil end E3: between slot Q1 of third conductor wire 73 and slot Q2 of fourth conductor wire 74
coil end E4: between slot Qn-1 of fourth conductor wire 74 and slot Qn of fifth conductor wire 75
coil end E5: between slot Q2 of fourth conductor wire 74 and slot Q2 of sixth conductor wire 76
coil end E6: between slot Qn-1 of fourth conductor wire 74 and slot Qn-1 of sixth conductor wire 76
lead wire L2: terminal of slot Q1 of fifth conductor wire 75

With connection and arrangement of those terminals and lead wires, the number of series turns of the division unit from the lead wire L1 to the lead wire L2 becomes (the number of slots Qn in the division unit)×(the number of series conductor wires: 5)/2.

Figure 8:
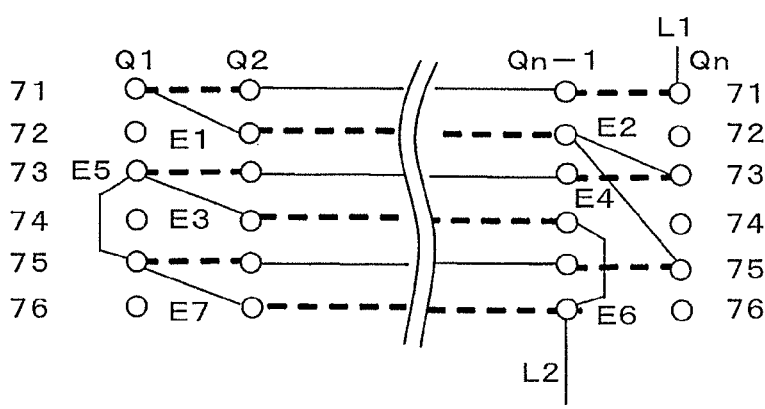
FIG. 8 is a schematic diagram illustrating wire connection in the division unit of the diagram as viewed from the direction of the arrow B of FIG. 5, when the number of series conductor wires is 4.

FIG. 8 is a schematic diagram illustrating wire connection in the division unit of the diagram as viewed from the direction of the arrow B of FIG. 5, when the number of series conductor wires is 4. In FIG. 8, the following positions are respectively connected.

lead wire L1: terminal of slot Qn of first conductor wire 71
coil end E1: between slot Q1 of first conductor wire 71 and slot Q2 of second conductor wire 72
coil end E2: between slot Qn-1 of second conductor wire 72 and slot Qn of third conductor wire 73
coil end E3: between slot Q1 of third conductor wire 73 and slot Q2 of fourth conductor wire 74
coil end E4: between slot Qn-1 of second conductor wire 72 and slot Qn of fifth conductor wire 75
coil end E5: between slot Q1 of third conductor wire 73 and slot Q1 of fifth conductor wire 75
coil end E6: between slot Qn-1 of fourth conductor wire 74 and slot Qn-1 of sixth conductor wire 76
coil end E7: between slot Q1 of fifth conductor wire 75 and slot Q2 of sixth conductor wire 76
lead wire L2: terminal of slot Qn-1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 4)/2.

Figure 9:
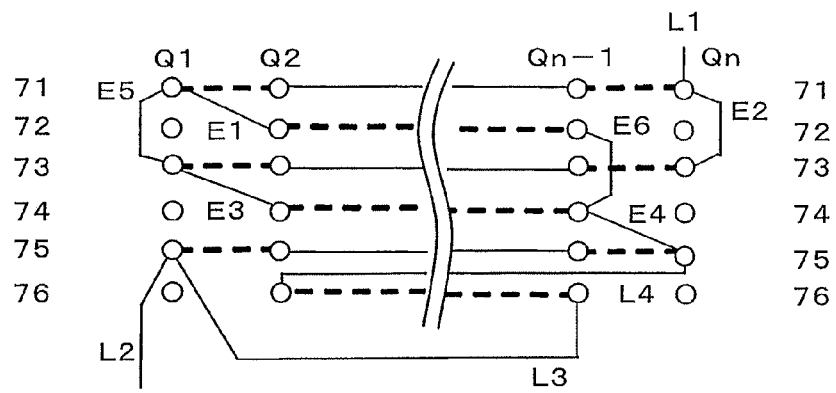
FIG. 9 is a schematic diagram illustrating wire connection in the division unit of the diagram as viewed from the direction of the arrow B of FIG. 5, when the number of series conductor wires is 3.

FIG. 9 is a schematic diagram illustrating wire connection in the division unit of the diagram as viewed from the direction of the arrow B of FIG. 5, when the number of series conductor wires is 3. In FIG. 9, the following positions are respectively connected.

lead wire L1: terminal of slot Qn of first conductor wire 71
coil end E1: between slot Q1 of first conductor wire 71 and slot Q2 of second conductor wire 72
coil end E2: between slot Qn of first conductor wire 71 and slot Qn of third conductor wire 73
coil end E3: between slot Q1 of third conductor wire 73 and slot Q2 of fourth conductor wire 74
coil end E4: between slot Qn-1 of fourth conductor wire 74 and slot Qn of fifth conductor wire 75
coil end E5: between slot Q1 of first conductor wire 71 and slot Q1 of third conductor wire 73
coil end E6: between slot Qn-1 of second conductor wire 72 and slot Qn-1 of fourth conductor wire 74
lead wire L3: between slot Q1 of fifth conductor wire 75 and slot Qn-1 of sixth conductor wire 76
lead wire L4: between slot Qn of fifth conductor wire 75 and slot Q2 of sixth conductor wire 76
lead wire L2: terminal of slot Q1 of fifth conductor wire 75

With connection and arrangement of those terminals and lead wires, the number of series turns of the division unit from the lead wire L1 to the lead wire L2 becomes (the number of slots Qn in the division unit)×(the number of series conductor wires: 3)/2.

Figure 10:
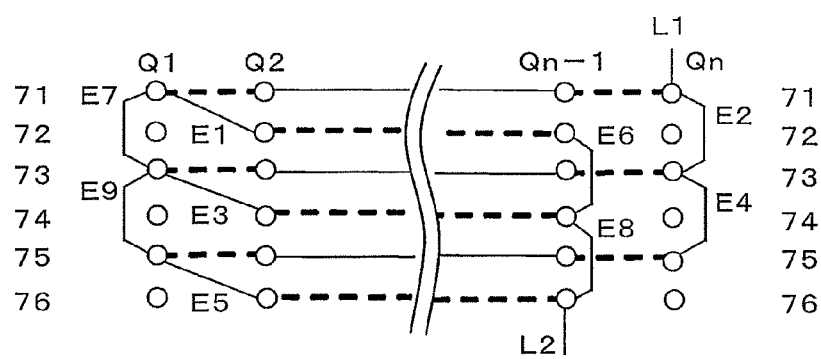
FIG. 10 is a schematic diagram illustrating wire connection in the division unit of the diagram as viewed from the direction of the arrow B of FIG. 5, when the number of series conductor wires is 2.

FIG. 10 is a schematic diagram illustrating wire connection in the division unit of the diagram as viewed from the direction of the arrow B of FIG. 5, when the number of series conductor wires is 2. In FIG. 10, the following positions are respectively connected.

lead wire L1: terminal of slot Qn of first conductor wire 71
coil end E1: between slot Q1 of first conductor wire 71 and slot Q2 of second conductor wire 72
coil end E2: between slot Qn of first conductor wire 71 and slot Qn of third conductor wire 73
coil end E3: between slot Q1 of third conductor wire 73 and slot Q2 of fourth conductor wire 74
coil end E4: between slot Qn of third conductor wire 73 and slot Qn of fifth conductor wire 75
coil end E5: between slot Q1 of fifth conductor wire 75 and slot Q2 of sixth conductor wire 76
coil end E6: between slot Qn-1 of second conductor wire 72 and slot Qn-1 of fourth conductor wire 74
coil end E7: between slot Q1 of first conductor wire 71 and slot Q1 of third conductor wire 73
coil end E8: between slot Qn-1 of fourth conductor wire 74 and slot Qn-1 of sixth conductor wire 76
coil end E9: between slot Q1 of third conductor wire 73 and slot Q1 of fifth conductor wire 75
lead wire L2: terminal of slot Qn-1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 2)/2.

Figure 11:
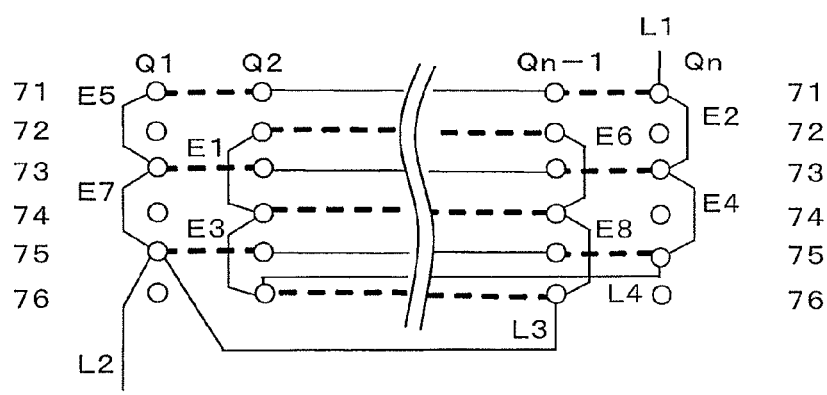
FIG. 11 is a schematic diagram illustrating wire connection in the division unit of the diagram as viewed from the direction of the arrow B of FIG. 5, when the number of series conductor wires is 1.

FIG. 11 is a schematic diagram illustrating wire connection in the division unit of the diagram as viewed from the direction of the arrow B of FIG. 5, when the number of series conductor wires is 1. In FIG. 11, the following positions are respectively connected.

lead wire L1: terminal of slot Qn of first conductor wire 71
coil end E1: between slot Q2 of second conductor wire 72 and slot Q2 of fourth conductor wire 74
coil end E2: between slot Qn of first conductor wire 71 and slot Qn of third conductor wire 73
coil end E3: between slot Q2 of fourth conductor wire 74 and slot Q2 of sixth conductor wire 76
coil end E4: between slot Qn of third conductor wire 73 and slot Qn of fifth conductor wire 75
coil end E5: between slot Q1 of first conductor wire 71 and slot Q1 of third conductor wire 73
coil end E6: between slot Qn-1 of second conductor wire 72 and slot Qn-1 of fourth conductor wire 74
coil end E7: between slot Q1 of third conductor wire 73 and slot Q1 of fifth conductor wire 75
coil end E8: between slot Qn-1 of fourth conductor wire 74 and slot Qn-1 of sixth conductor wire 76
lead wire L3: between slot Qn-1 of sixth conductor wire 76 and slot Q1 of fifth conductor wire 75
lead wire L4: between slot Qn of fifth conductor wire 75 and slot Q2 of sixth conductor wire 76
lead wire L2: terminal of slot Q1 of fifth conductor wire 75

With connection and arrangement of those terminals and lead wires, the number of series turns of the division unit from the lead wire L1 to the lead wire L2 becomes (the number of slots Qn in the division unit)×(the number of series conductor wires: 1)/2.

Subsequently, FIGS. 12 to 17 described below illustrate a wire-connection method in a case where the coil ends 77 of all of the first conductor wire 71 to the sixth conductor wire 76 are located at the same circumferential position and at the same axial end portion.

Figure 12:
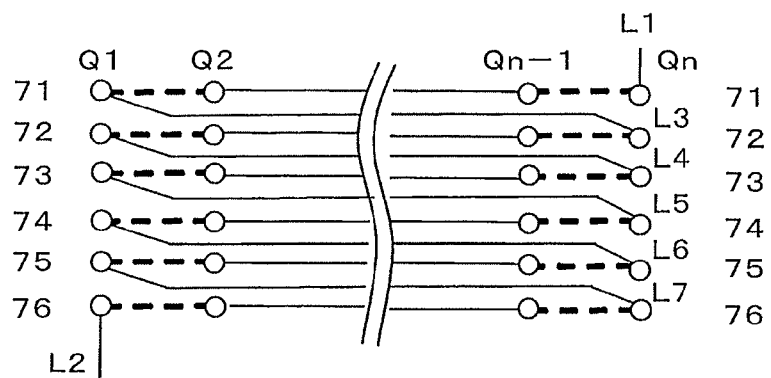
FIG. 12 is a schematic diagram illustrating wire connection in the division unit of the diagram as viewed from the direction of the arrow B of FIG. 5, when the number of series conductor wires is 6.

FIG. 12 is a schematic diagram illustrating wire connection in the division unit of the diagram as viewed from the direction of the arrow B of FIG. 5, when the number of series conductor wires is 6. In FIG. 12, the following positions are respectively connected.

lead wire L1: terminal of slot Qn of first conductor wire 71
lead wire L3: between slot Q1 of first conductor wire 71 and slot Qn of second conductor wire 72
lead wire L4: between slot Q1 of second conductor wire 72 and slot Qn of third conductor wire 73
lead wire L5: between slot Q1 of third conductor wire 73 and slot Qn of fourth conductor wire 74
lead wire L6: between slot Q1 of fourth conductor wire 74 and slot Qn of fifth conductor wire 75
lead wire L7: between slot Q1 of fifth conductor wire 75 and slot Qn of sixth conductor wire 76
lead wire L2: terminal of slot Q1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 6)/2.

Figure 13:
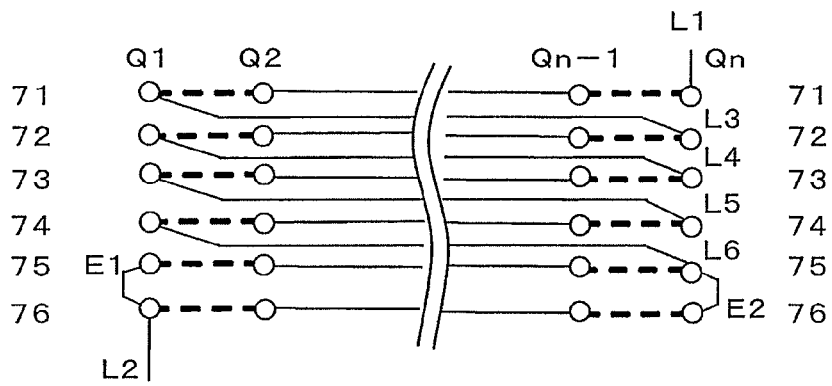
FIG. 13 is a schematic diagram illustrating wire connection in the division unit of the diagram as viewed from the direction of the arrow B of FIG. 5, when the number of series conductor wires is 5.

FIG. 13 is a schematic diagram illustrating wire connection in the division unit of the diagram as viewed from the direction of the arrow B of FIG. 5, when the number of series conductor wires is 5. In FIG. 13, the following positions are respectively connected.

lead wire L1: terminal of slot Qn of first conductor wire 71
lead wire L3: between slot Q1 of first conductor wire 71 and slot Qn of second conductor wire 72
lead wire L4: between slot Q1 of second conductor wire 72 and slot Qn of third conductor wire 73 lead wire L5: between slot Q1 of third conductor wire 73 and slot Qn of fourth conductor wire 74 lead wire L6: between slot Q1 of fourth conductor wire 74 and slot Qn of fifth conductor wire 75 coil end E1: between slot Q1 of fifth conductor wire 75 and slot Q1 of sixth conductor wire 76 coil end E2: between slot Qn of fifth conductor wire 75 and slot Qn of sixth conductor wire 76 lead wire L2: terminal of slot Q1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 5)/2.

Figure 14:
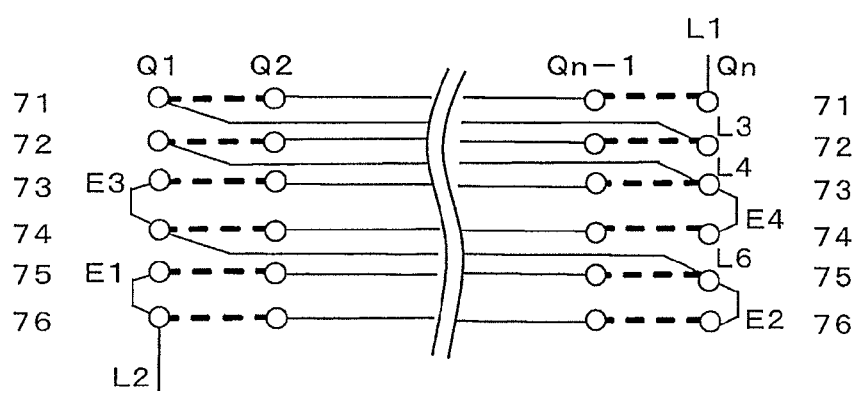
FIG. 14 is a schematic diagram illustrating wire connection in the division unit of the diagram as viewed from the direction of the arrow B of FIG. 5, when the number of series conductor wires is 4.

FIG. 14 is a schematic diagram illustrating wire connection in the division unit of the diagram as viewed from the direction of the arrow B of FIG. 5, when the number of series conductor wires is 4. In FIG. 14, the following positions are respectively connected.

lead wire L1: terminal of slot Qn of first conductor wire 71 lead wire L3: between slot Q1 of first conductor wire 71 and slot Qn of second conductor wire 72 lead wire L4: between slot Q1 of second conductor wire 72 and slot Qn of third conductor wire 73 lead wire L6: between slot Q1 of fourth conductor wire 74 and slot Qn of fifth conductor wire 75 coil end E1: between slot Q1 of fifth conductor wire 75 and slot Q1 of sixth conductor wire 76 coil end E2: between slot Qn of fifth conductor wire 75 and slot Qn of sixth conductor wire 76 coil end E3: between slot Q1 of third conductor wire 73 and slot Q1 of fourth conductor wire 74 coil end E4: between slot Qn of third conductor wire 73 and slot Qn of fourth conductor wire 74 lead wire L2: terminal of slot Q1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 4)/2.

Figure 15:
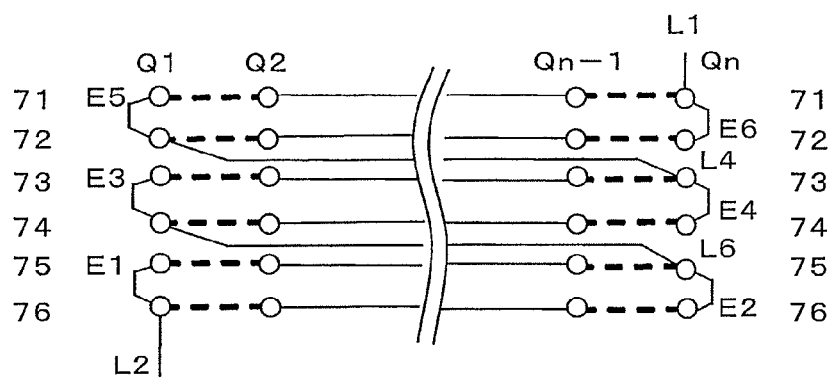
FIG. 15 is a schematic diagram illustrating wire connection in the division unit of the diagram as viewed from the direction of the arrow B of FIG. 5, when the number of series conductor wires is 3.

FIG. 15 is a schematic diagram illustrating wire connection in the division unit of the diagram as viewed from the direction of the arrow B of FIG. 5, when the number of series conductor wires is 3. In FIG. 15, the following positions are respectively connected.

lead wire L1: terminal of slot Qn of first conductor wire 71 lead wire L4: between slot Q1 of second conductor wire 72 and slot Qn of third conductor wire 73 lead wire L6: between slot Q1 of fourth conductor wire 74 and slot Qn of fifth conductor wire 75 coil end E1: between slot Q1 of fifth conductor wire 75 and slot Q1 of sixth conductor wire 76 coil end E2: between slot Qn of fifth conductor wire 75 and slot Qn of sixth conductor wire 76 coil end E3: between slot Q1 of third conductor wire 73 and slot Q1 of fourth conductor wire 74 coil end E4: between slot Qn of third conductor wire 73 and slot Qn of fourth conductor wire 74 coil end E5: between slot Q1 of first conductor wire 71 and slot Q1 of second conductor wire 72 coil end E6: between slot Qn of first conductor wire 71 and slot Qn of second conductor wire 72 lead wire L2: terminal of slot Q1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 3)/2.

Figure 16:
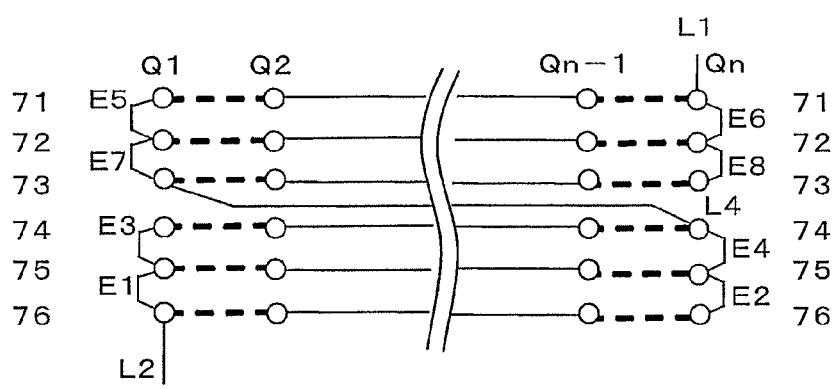
FIG. 16 is a schematic diagram illustrating wire connection in the division unit of the diagram as viewed from the direction of the arrow B of FIG. 5, when the number of series conductor wires is 2.

FIG. 16 is a schematic diagram illustrating wire connection in the division unit of the diagram as viewed from the direction of the arrow B of FIG. 5, when the number of series conductor wires is 2. In FIG. 16, the following positions are respectively connected.

lead wire L1: terminal of slot Qn of first conductor wire 71 lead wire L4: between slot Q1 of third conductor wire 73 and slot Qn of fourth conductor wire 74 coil end E1: between slot Q1 of fifth conductor wire 75 and slot Q1 of sixth conductor wire 76 coil end E2: between slot Qn of fifth conductor wire 75 and slot Qn of sixth conductor wire 76 coil end E3: between slot Q1 of fourth conductor wire 74 and slot Q1 of fifth conductor wire 75 coil end E4: between slot Qn of fourth conductor wire 74 and slot Qn of fifth conductor wire 75 coil end E5: between slot Q1 of first conductor wire 71 and slot Q1 of second conductor wire 72 coil end E6: between slot Qn of first conductor wire 71 and slot Qn of second conductor wire 72 coil end E7: between slot Q1 of second conductor wire 72 and slot Q1 of third conductor wire 73 coil end E8: between slot Qn of second conductor wire 72 and slot Qn of third conductor wire 73 lead wire L2: terminal of slot Q1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 2)/2.

Figure 17:
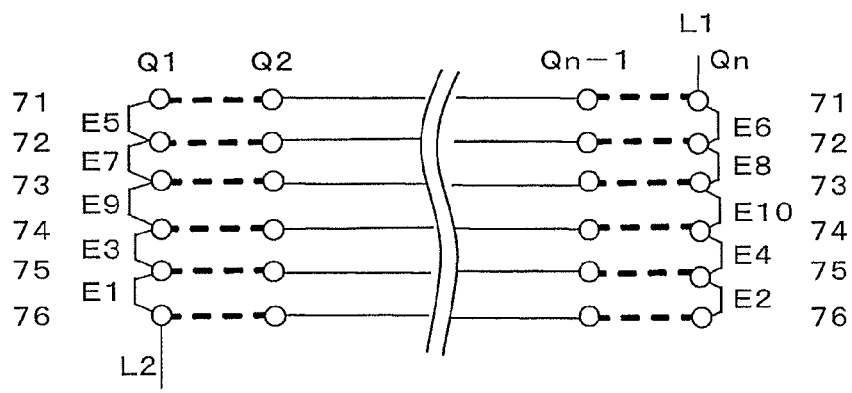
FIG. 17 is a schematic diagram illustrating wire connection in the division unit of the diagram as viewed from the direction of the arrow B of FIG. 5, when the number of series conductor wires is 1.

FIG. 17 is a schematic diagram illustrating wire connection in the division unit of the diagram as viewed from the direction of the arrow B of FIG. 5, when the number of series conductor wires is 1. In FIG. 17, the following positions are respectively connected.

lead wire L1: terminal of slot Qn of first conductor wire 71 coil end E1: between slot Q1 of fifth conductor wire 75 and slot Q1 of sixth conductor wire 76 coil end E2: between slot Qn of fifth conductor wire 75 and slot Qn of sixth conductor wire 76 coil end E3: between slot Q1 of fourth conductor wire 74 and slot Q1 of fifth conductor wire 75 coil end E4: between slot Qn of fourth conductor wire 74 and slot Qn of fifth conductor wire 75 coil end E5: between slot Q1 of first conductor wire 71 and slot Q1 of second conductor wire 72 coil end E6: between slot Qn of first conductor wire 71 and slot Qn of second conductor wire 72 coil end E7: between slot Q1 of second conductor wire 72 and slot Q1 of third conductor wire 73 coil end E8: between slot Qn of second conductor wire 72 and slot Qn of third conductor wire 73 coil end E9: between slot Q1 of third conductor wire 73 and slot Q1 of fourth conductor wire 74 coil end E10: between slot Qn of third conductor wire 73 and slot Qn of fourth conductor wire 74 lead wire L2: terminal of slot Q1 of sixth conductor wire 76

With connection and arrangement of those terminals and lead wires, the number of series turns of the division unit from the lead wire L1 to the lead wire L2 becomes (the number of slots Qn in the division unit)×(the number of series conductor wires: 1)/2.

As described above, the six conductor wires forming a coil of a certain phase include the respective pairs of the first conductor wire 71 and the second conductor wire 72, the third conductor wire 73 and the fourth conductor wire 74, and the fifth conductor wire 75 and the sixth conductor wire 76. Both in the cases where the coil ends 77 of each pair are located at the axial end surfaces on opposite sides and at the axial end surface on the same side, the coil ends 77 located at substantially the same circumferential direction are bent back. Under this state, the six conductor wires are mounted from the slots Q1 to Qn. With this wire-connection method, the number of the conductor wires of the division unit can be taken from 1 to 6.

With this, without decreasing a space factor which is a rate of the conductor wire area with respect to the slot area and without changing the number of conductor wires per slot, the number of turns can be changed merely by the wire-connection method. Therefore, wider choices of the number of series turns can be achieved, and hence it is possible to increase the degree of freedom in design of the number of series turns of the rotary electric machine in accordance with the required specification without increasing copper loss of the rotary electric machine.

Further, in the wire-connection method illustrated in FIG. 7, 8, 13, or 14, within the circumferentially-divided wave windings (division unit), the conductor wires connected in series and the conductor wires connected in parallel to each other at division positions located at substantially the same circumferential positions of the conductor-wire end portions are connected in series to each other. In this case, the effect caused because the winding can be performed without decreasing the conductor-wire space factor becomes large from the following reasons.

That is, in the general design, in order to avoid a connection operation required when conductor wires having different dimensions are housed in the same slot, conductor wires having the same dimension are used in many cases. In those cases, as described above, in the slot in which the number of conductor wires to be housed is reduced, the conductor-wire space factor is reduced to increase the gap inside the slot. Therefore, the conductor wires may easily vibrate, which may easily cause short circuit between the wires or between the wire and an inner wall of the slot. Thus, there arises a new problem in that the reliability of the AC generator is deteriorated.

Further, in the case where the number of turns of the stator winding is reduced only in a part of the slots of the stator, as compared to a case where the stator winding is equally wound with respect to all of the slots, the manufacturing facility becomes more complicated, and there also arises a problem of cost increase. To address those problems, in the first embodiment of the present invention, the number of turns can be changed merely by the wire-connection method without changing the conductor-wire space factor, and hence the above-mentioned problems do not occur.

Further, within the division unit of the wire-connection method illustrated in FIG. 6, 9, 10, 11, 12, 15, 16, or 17, for example, as a state illustrated in FIG. 9 in which the slot Q1 of the first conductor wire 71 and the slot Q1 of the third conductor wire 73 are connected by the coil end E5, and the slot Qn of the first conductor wire 71 and the slot Qn of the third conductor wire 73 are connected by the coil end E2, at division positions located at substantially the same circumferential positions of the conductor-wire end portions, all of the conductor wires are each connected in parallel to at least one another conductor wire. In addition, as the state illustrated in FIG. 9 in which the slot Q1 of the fifth conductor wire 75 and the slot Qn-1 of the sixth conductor wire 76 are connected by the lead wire L3, and the slot Q2 of the sixth conductor wire 76 and the slot Qn of the fifth conductor wire 75 are connected by the lead wire L4, two conductor wires within the division unit are connected to each other at one substantial end portion and another substantial end portion of the division positions. In this case, a current per sectional area of the conductor wire can be unified in the slot, and hence local overheat can be prevented.

Further, all parallel circuits are equally arranged in the respective slots within the division unit, and hence, in the respective parallel circuits of the division unit, the amplitude and the phase of the generated inductive voltage are unified, and no circulating current flows.

Further, in a case where, with use of the wire-connection method illustrated in FIG. 6, 8, 10, 12, 14, or 16, division units, both of which having the power source high voltage side and low voltage side of the wave windings located at substantially the same position in the circumferential direction, are connected in series to each other, the connecting positions can be set at substantially the same position, and hence wire-connection workability is improved.

Further, in a case where, with use of the wire-connection method illustrated in FIG. 7, 9, 11, 13, 15, or 17, division units, both of which having the power source high voltage side and low voltage side of the wave windings located on opposite sides in the circumferential direction, are connected in series to each other, the connecting positions can be set at different positions in the circumferential direction. Thus, series wire connection is facilitated, and the wire-connection space can be reduced. Therefore, the rotary electric machine can be downsized.

Further, in a case where, with use of the wire-connection methods illustrated in FIGS. 6 to 17, a division unit having both the power source high voltage side and low voltage side of the wave windings located at substantially the same position in the circumferential direction and a division unit having the power source high voltage side and low voltage side of the wave windings located on opposite sides in the circumferential direction are connected in series to each other, when it is necessary to perform wire connection with a lead wire crossing in the circumferential direction, the division unit having the power source high voltage side and low voltage side of the wave windings located on opposite sides in the circumferential direction can be used as a substitute for the lead wire. In this manner, a space for the crossing line can be omitted, and hence the rotary electric machine can be downsized.

Note that, in a case where the overlapping of the coil ends is reduced, which is generated by bending back the coil ends of the six conductor wires forming the coil of a certain phase, the coil ends being located at substantially the same circumferential position, it is more desired to locate the coil ends at substantially the same circumferential position of the axial end surfaces on opposite sides than locating the coil ends at substantially the same circumferential position of the axial end surface on the same side.

Further, even when the number of divisions in the circumferential direction is one, only one division unit is provided, but a structure similar to the above-mentioned wire connection can be achieved in the division unit. Therefore, without decreasing the conductor-wire space factor and without changing the number of conductor wires per slot, the number of turns can be changed merely by the wire-connection method. Therefore, wider choices of the number of series turns can be achieved, and hence it is possible to increase the degree of freedom in design of the number of series turns of the rotary electric machine in accordance with the required specification without increasing copper loss of the rotary electric machine.

Next, FIGS. 18 to 29 show a combination of the total number of series turns in a case where the total number of slots of a certain phase is 10 and each division unit in a case of dual division and the number of series turns in the division unit are combined.

Figures 18, 19:
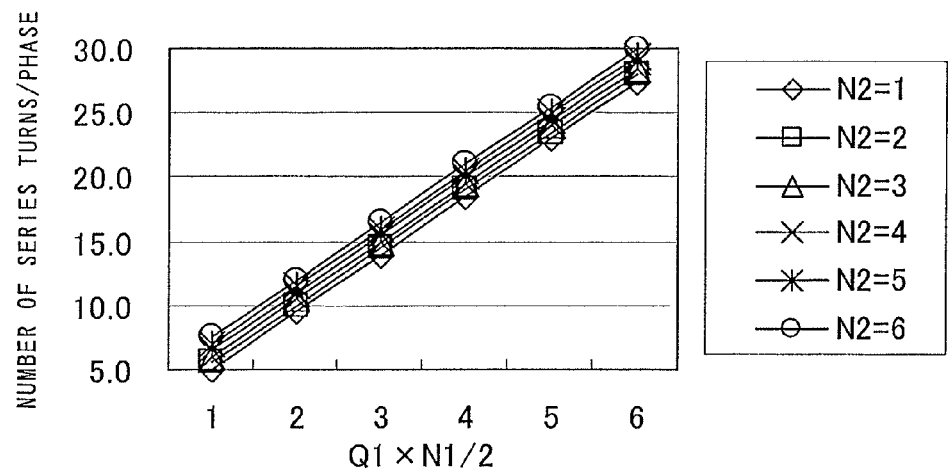
FIG. 18 is an explanatory graph showing, when the number of slots in one division unit is 9 and the number of slots in another division unit is 1 in the first embodiment of the present invention, a range of the total number of series turns with respect to the number of series turns in the division unit in which the number of slots is 9.
FIG. 19 is a table of the combination shown in FIG. 18.

FIG. 18 is an explanatory graph showing, when the number of slots in one division unit is 9 and the number of slots in another division unit is 1, a range of the total number of series turns in the entire 10 slots with respect to the number of series turns in the division unit in which the number of slots is 9, when the respective division units, which have wire-connections in a combination obtained from those illustrated in FIGS. 6 to 11 or FIGS. 12 to 17, are connected in series by connecting one of the lead wires L1 and L2 of the one division unit to that of the another division unit.

Further, FIG. 19 is a table of the combination shown in FIG. 18. In FIG. 19, Qn represents the number of slots in the division unit, Nn represents the number of series conductor wires of the division unit, and Qn×Nn/2 is (the number of slots in the division unit)×(the number of series conductor wires)/2, which represents the number of series turns within the division unit. Note that, similar reference symbols are also used in FIGS. 21, 23, 25, 27, and 29 below.

It is understood from FIGS. 18 and 19 that the total number of series turns of the entire 10 slots can be taken in a range of 5 to 30 turns, and a minimum interval thereof is 0.5 turns.

Figures 20, 21:
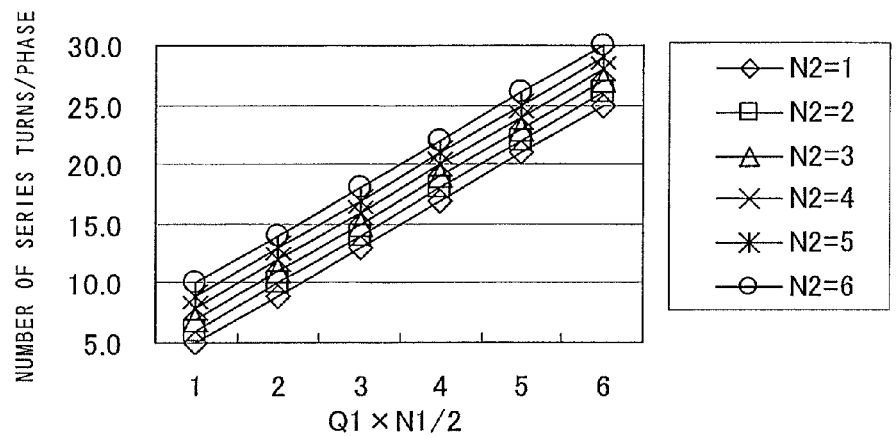
FIG. 20 is an explanatory graph showing, when the number of slots in one division unit is 8 and the number of slots in another division unit is 2 in the first embodiment of the present invention, a range of the total number of series turns with respect to the number of series turns in the division unit in which the number of slots is 8.
FIG. 21 is a table of the combination shown in FIG. 20.

FIG. 20 is an explanatory graph showing, when the number of slots in one division unit is 8 and the number of slots in another division unit is 2, a range of the total number of series turns in the entire 10 slots with respect to the number of series turns in the division unit in which the number of slots is 8, when the respective division units, which have wire-connections in a combination obtained from those illustrated in FIGS. 6 to 11 or FIGS. 12 to 17, are connected in series by connecting one of the lead wires L1 and L2 of the one division unit to that of the another division unit.

Further, FIG. 21 is a table of the combination shown in FIG. 20. It is understood from FIGS. 20 and 21 that the total number of series turns of the entire 10 slots can be taken in a range of 5 to 30 turns, and a minimum interval thereof is 1.0 turns.

Figures 22, 23:
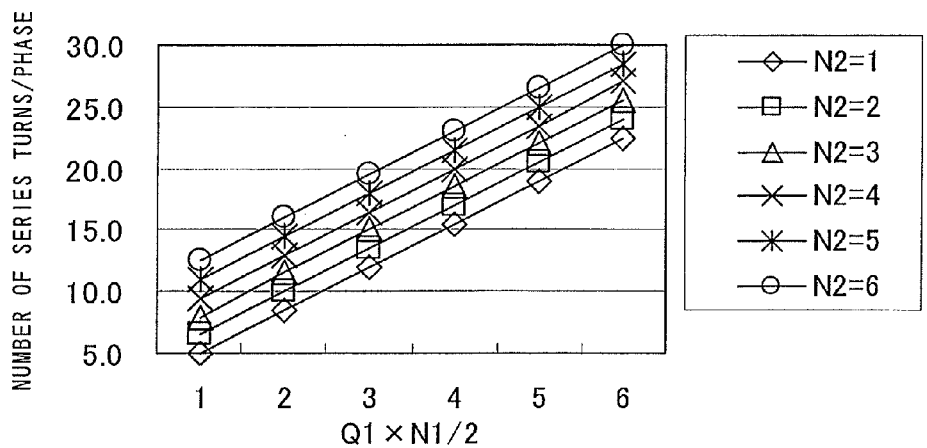
FIG. 22 is an explanatory graph showing, when the number of slots in one division unit is 7 and the number of slots in another division unit is 3 in the first embodiment of the present invention, a range of the total number of series turns with respect to the number of series turns in the division unit in which the number of slots is 7.
FIG. 23 is a table of the combination shown in FIG. 22.

FIG. 22 is an explanatory graph showing, when the number of slots in one division unit is 7 and the number of slots in another division unit is 3, a range of the total number of series turns in the entire 10 slots with respect to the number of series turns in the division unit in which the number of slots is 7, when the respective division units, which have wire-connections in a combination obtained from those illustrated in FIGS. 6 to 11 or FIGS. 12 to 17, are connected in series by connecting one of the lead wires L1 and L2 of the one division unit to that of the another division unit.

Further, FIG. 23 is a table of the combination shown in FIG. 22. It is understood from FIGS. 22 and 23 that the total number of series turns of the entire 10 slots can be taken in a range of 5 to 30 turns, and a minimum interval thereof is 0.5 turns.

Figures 24, 25:
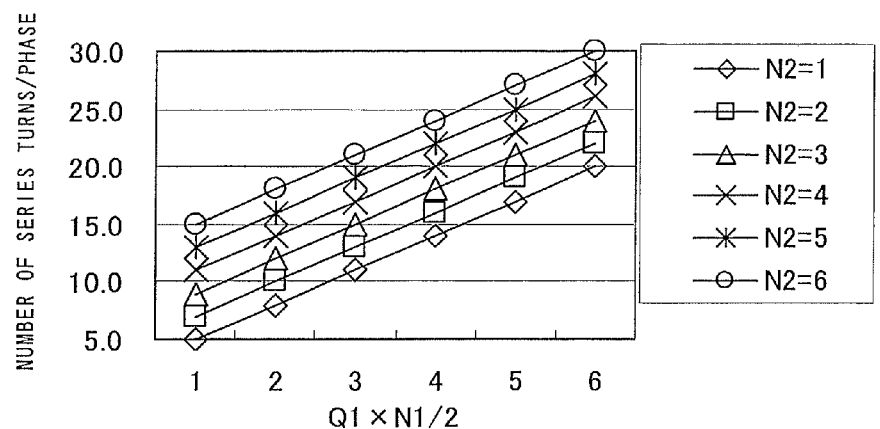
FIG. 24 is an explanatory graph showing, when the number of slots in one division unit is 6 and the number of slots in another division unit is 4 in the first embodiment of the present invention, a range of the total number of series turns with respect to the number of series turns in the division unit in which the number of slots is 6.
FIG. 25 is a table of the combination shown in FIG. 24.

FIG. 24 is an explanatory graph showing, when the number of slots in one division unit is 6 and the number of slots in another division unit is 4, a range of the total number of series turns in the entire 10 slots with respect to the number of series turns in the division unit in which the number of slots is 6, when the respective division units, which have wire-connections in a combination obtained from those illustrated in FIGS. 6 to 11 or FIGS. 12 to 17, are connected in series by connecting one of the lead wires L1 and L2 of the one division unit to that of the another division unit.

Further, FIG. 25 is a table of the combination shown in FIG. 24. It is understood from FIGS. 24 and 25 that the total number of series turns of the entire 10 slots can be taken in a range of 5 to 30 turns, and a minimum interval thereof is 1.0 turns.

Figures 26, 27:
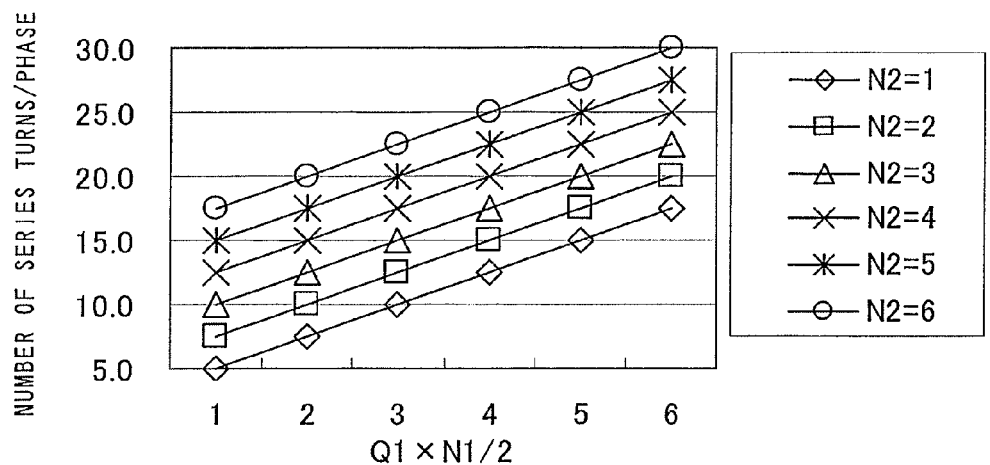
FIG. 26 is an explanatory graph showing, when the number of slots in one division unit is 5 and the number of slots in another division unit is 5 in the first embodiment of the present invention, a range of the total number of series turns with respect to the number of series turns in the division unit in which the number of slots is 5.
FIG. 27 is a table of the combination shown in FIG. 26.

FIG. 26 is an explanatory graph showing, when the number of slots in one division unit is 5 and the number of slots in another division unit is 5, a range of the total number of series turns in the entire 10 slots with respect to the number of series turns in the division unit in which the number of slots is 5, when the respective division units, which have wire-connections in a combination obtained from those illustrated in FIGS. 6 to 11 or FIGS. 12 to 17, are connected in series by connecting one of the lead wires L1 and L2 of the one division unit to that of the another division unit.

Further, FIG. 27 is a table of the combination shown in FIG. 26. It is understood from FIGS. 26 and 27 that the total number of series turns of the entire 10 slots can be taken in a range of 5 to 30 turns, and a minimum interval thereof is 2.5 turns.

Figures 28, 29:
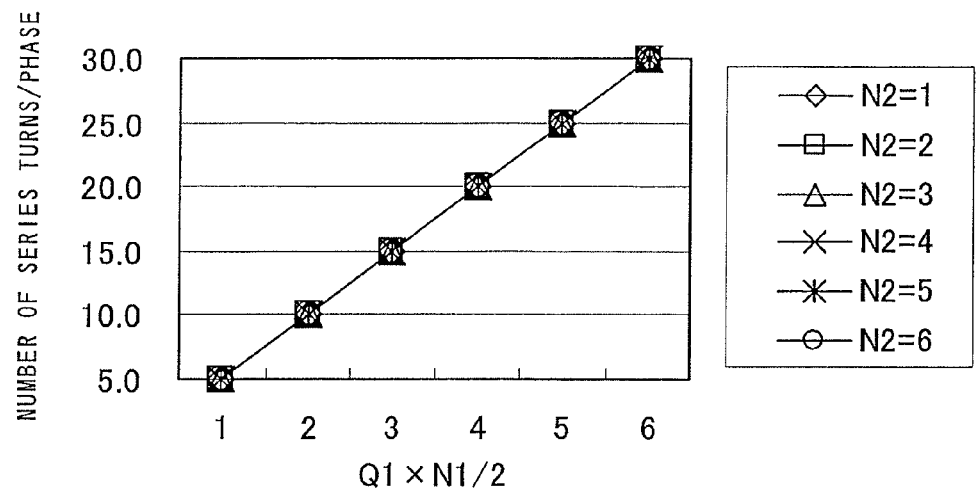
FIG. 28 is an explanatory graph showing, when the number of slots in one division unit is 10 and the number of slots in another division unit is 0 in the first embodiment of the present invention, a range of the total number of series turns with respect to the number of series turns in the division unit in which the number of slots is 10.
FIG. 29 is a table of the combination shown in FIG. 28.

FIG. 28 is an explanatory graph showing, when the number of slots in one division unit is 10 and the number of slots in another division unit is 0 (when the number of slots is not divided), a range of the total number of series turns in the entire 10 slots with respect to the number of series turns in the division unit in which the number of slots is 10, when the respective division units, which have wire-connections in a combination obtained from those illustrated in FIGS. 6 to 11 or FIGS. 12 to 17, are connected in series by connecting one of the lead wires L1 and L2 of the one division unit to that of the another division unit.

Further, FIG. 29 is a table of the combination shown in FIG. 28. It is understood from FIGS. 28 and 29 that the total number of series turns of the entire 10 slots can be taken in a range of 5 to 30 turns, and a minimum interval thereof is 5.0 turns.

It is understood from FIGS. 18 to 29 that, as compared to the case of one division, a smaller minimum interval can be taken in the case of dual division even in the range of the same total number of series turns. With this, without changing the number of conductor wires per slot but combining the wire-connection method and the number of slots in the division unit, the number of series turns can be changed for each 0.5 turns. Therefore, wider choices of the number of series turns can be achieved, and hence it is possible to increase the degree of freedom in design of the number of series turns of the rotary electric machine in accordance with the required voltage specification of the rotary electric machine.

Figure 30:
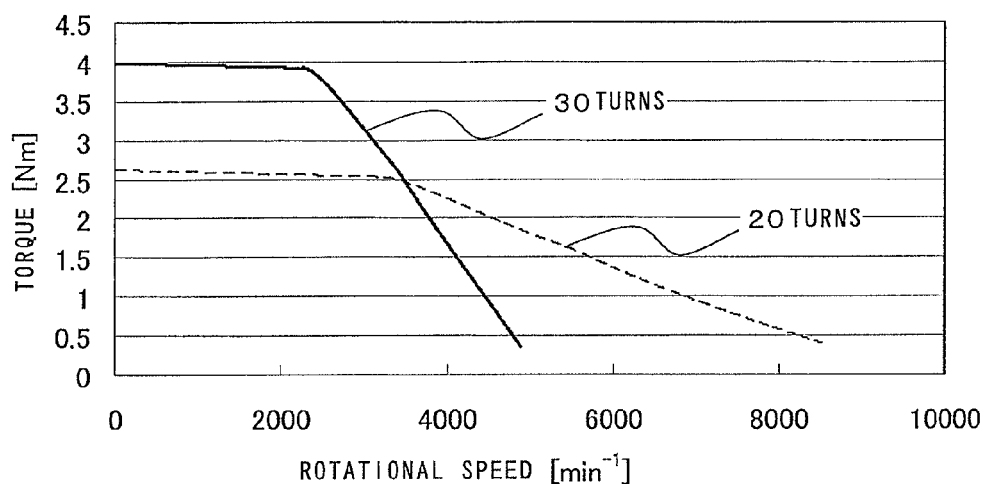
FIG. 30 is an explanatory graph showing a torque with respect to a rotational speed of the rotary electric machine when the number of series turns of the rotary electric machine is changed in the first embodiment of the present invention.

FIG. 30 is an explanatory graph showing a torque with respect to a rotational speed of the rotary electric machine when the number of series turns of the rotary electric machine is changed in the first embodiment of the present invention. It is understood from FIG. 30 that, when the total number of series turns of a certain phase is changed from 30 turns to 20 turns, the torque of the rotary electric machine decreases in proportional to the total number of series turns of the certain phase, but the rotational speed of the rotary electric machine increases substantially in inversely proportional to the total number of series turns of the certain phase.

With this, when many choices of the total number of series turns of the certain phase can be achieved in the same range, it is possible to flexibly respond to the demand of characteristics of the torque with respect to the rotational speed of the rotary electric machine. Further, choices of the size of the rotary electric machine for realizing the characteristics required for the rotary electric machine increase, and thus the most appropriate size can be selected for the rotary electric machine. Therefore, the rotary electric machine can be downsized.

Further, in the first embodiment of the present invention, it is possible to fix a current or voltage phase of a coil of a certain phase, and hence as compared to a method in which a coil of a certain phase and a coil of another phase are connected to each other at end portions thereof so that connection is made in the middle of the certain phase, the control method for the rotary electric machine is facilitated.

Further, the coil has a structure in which, on the outer side of the axial end surface of the stator core, the coil ends are bent back to be wave-wound, and the coil end parts are minimally divided at substantially the same circumferential position. Therefore, as compared to the method in which the coil end is cut for each slot, the number of steps of wire-connection operation can be significantly reduced.

As described above, according to the first embodiment, the coil is configured so that: N conductor wires of wave windings each divided at at least two positions in the circumferential direction are provided in one slot; within a unit of the divided wave windings in which conduction is made, the N conductor wires are connected in series or parallel to each other at division positions located at substantially the same circumferential position of the conductor-wire end portions; in the each phase, division units of the divided wave windings are connected in series to each other, and a total number of series turns of the series-connected division units of the each phase is a predetermined number of series turns, which does not exceed an upper limit value of a terminal voltage of the rotary electric machine; and the series-connected division units of the each phase have the same total number of series turns.

As a result, without changing the number of conductor wires per slot, the number of turns can be changed merely by the wire-connection method. With this, wider choices of the number of series turns can be achieved, and hence it is possible to increase the degree of freedom in design of the number of series turns of the rotary electric machine in accordance with the required specification without increasing copper loss of the rotary electric machine.

Note that, in the above-mentioned first embodiment, the entire number of slots is not limited to 30, and may be a positive integer multiple of 3. Further, the number of conductor wires forming a coil of a certain phase is not limited to 6, and may be N (N is a positive integer of 2 or more). Also in those cases, similarly to the above-mentioned first embodiment, the conductor wires are connected in series or parallel to each other at the division positions, and hence the number of series conductor wires of the division unit can be taken from 1 to N. Therefore, it is possible to achieve wider choices of the number of series turns of the rotary electric machine.

Further, the connection between the conductor wires within the division unit is not limited to those illustrated in FIGS. 6 to 17. For example, in FIG. 6, instead of connecting the lead wire L1 to the terminal of the slot Qn of the first conductor wire 71, the lead wire L1 may be connected to the terminal of the slot Qn of the third conductor wire 73. Further, instead of connecting the coil end E2 to the slot Qn of the third conductor wire 73, the coil end E2 may be connected to the slot Qn of the first conductor wire 71. Further, instead of connecting the coil end E1 to the terminal of the slot Q2 of the second conductor wire 72, the coil end E1 may be connected to the terminal of the slot Q2 of the fourth conductor wire 74. Further, instead of connecting the coil end E3 to the slot Q2 of the fourth conductor wire 74, the coil end E3 may be connected to the slot Q2 of the second conductor wire 72.

As described above, connection between the conductor wires having odd numbers, such as the first, third, and fifth conductor wires, or connection between the conductor wires having even numbers, such as the second, fourth, and sixth conductor wires, can be exchanged at both circumferential ends of the division unit. Also in this case, the effects similar to those of the above-mentioned first embodiment can be obtained.

Second Embodiment

Figure 31:
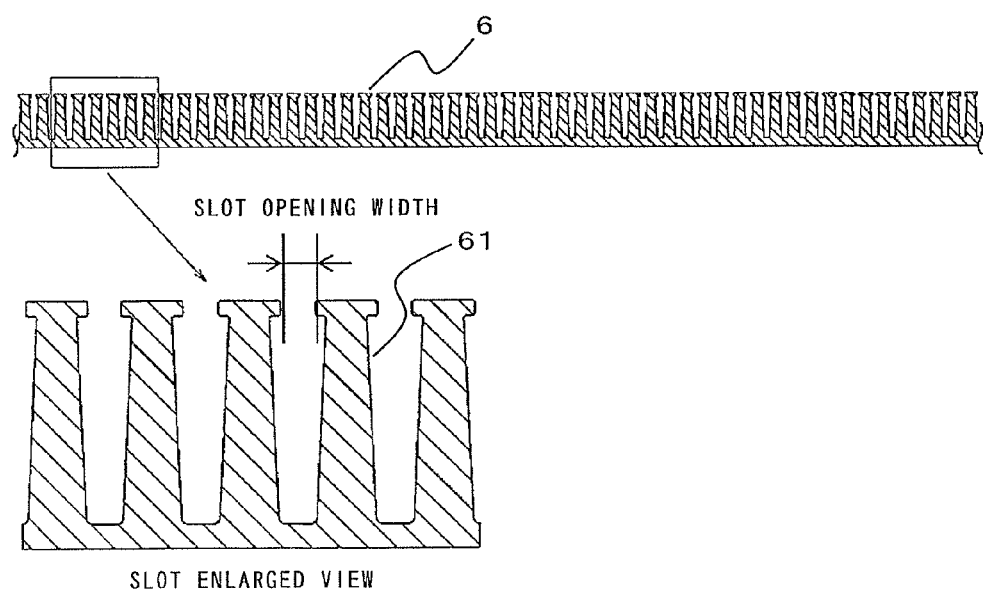
FIG. 31 is a structural view illustrating a stator core before a wave winding is mounted according to a second embodiment of the present invention.
Figure 32:
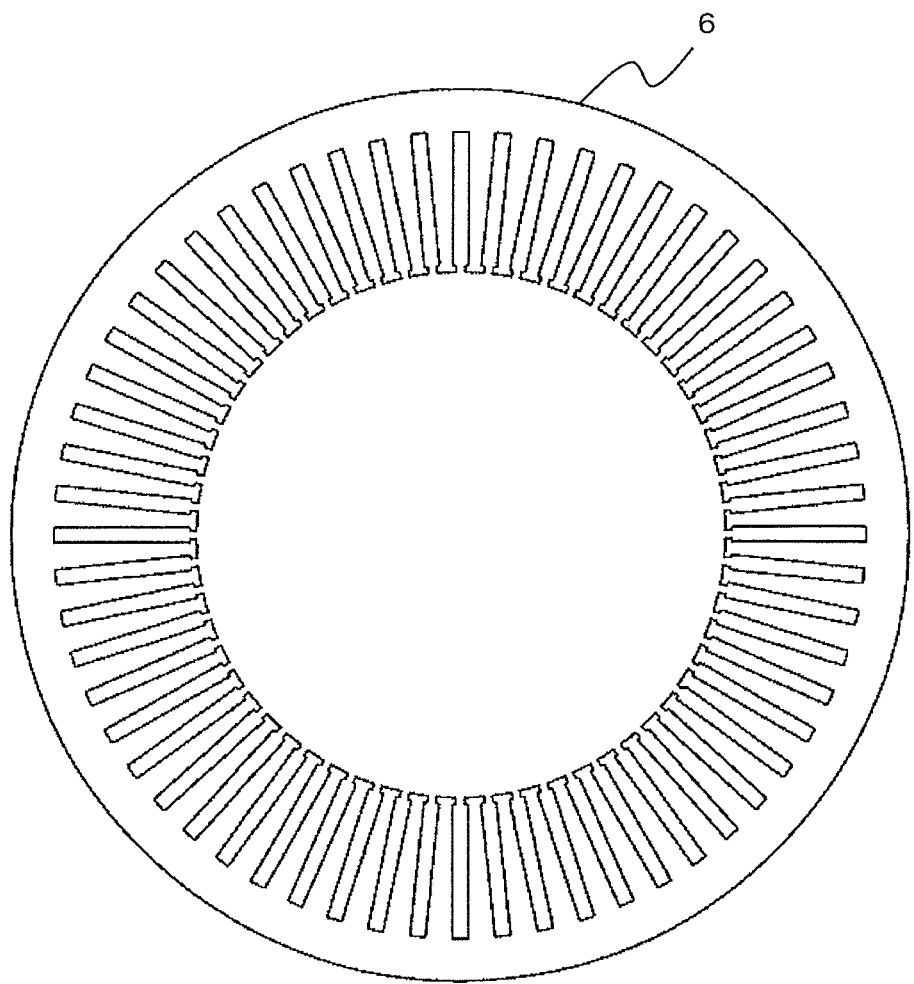
FIG. 32 is a structural view illustrating the stator core after the wave winding is mounted and the stator core is welded in the second embodiment of the present invention.

FIG. 31 is a structural view illustrating a stator core before a wave winding is mounted according to a second embodiment of the present invention. Further, FIG. 32 is a structural view illustrating the stator core after the wave winding is mounted and the stator core is welded in the second embodiment of the present invention.

In FIG. 31, the stator core 6 of the above-mentioned first embodiment is divided at one position in the arc circumferential direction to have a linear shape. After the wave winding and the insulating member are mounted in the slots 61 of the stator core 6, the stator core 6 is rolled to bring end surfaces of the stator core 6 into abutment to each other, and then the end surfaces are welded. Thus, the circular stator core 6 of FIG. 32 is formed.

Figure 33:
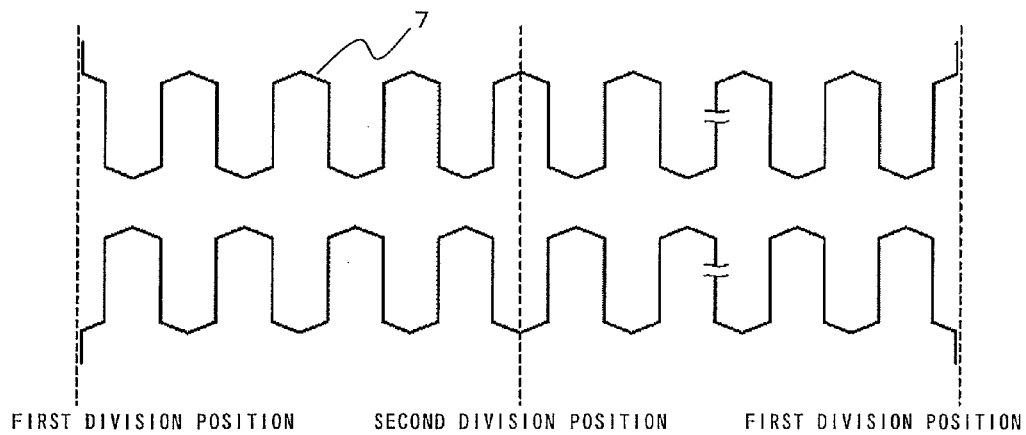
FIG. 33 is a plan view illustrating a state of a coil before the wave winding is mounted to the stator core in the second embodiment of the present invention.

FIG. 33 is a plan view illustrating a state of the coil before the wave winding is mounted to the stator core in the second embodiment of the present invention. In FIG. 33, in order to provide the coil 7 into the slots 61 of the linearly-developed stator core 6, the coil 7 is divided in the circumferential direction at at least two positions in total, that is, one position to obtain both ends and at several arbitrary portions between both the ends (first division position, second division position, and others). Therefore, similarly to the above-mentioned first embodiment, wire-connection within a division unit of a certain phase and series connection between the division units are possible.

With this, a dimension of a slot opening width through which the wave winding is inserted is larger in the state in which the stator core 6 has a linear shape than in the state in which the stator core 6 has a circular shape, and hence the workability is improved when the wave winding is mounted to the stator core 6. Further, division is made to obtain both the ends of the coil 7 in conformity to the insertion shape to the stator core 6, and hence through division of at least one arbitrary position between both the ends of the coil 7, the effects similar to those of the above-mentioned first embodiment can be obtained.

Third Embodiment

Figure 34:
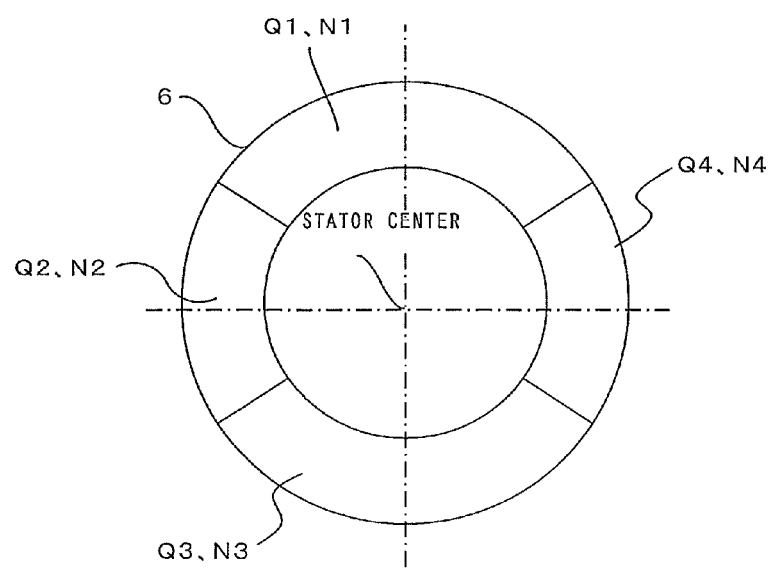
FIG. 34 is a schematic diagram illustrating a division state of a wave winding in a third embodiment of the present invention, when viewed from an axial end portion of a stator.

FIG. 34 is a schematic diagram illustrating a division state of a wave winding in a third embodiment of the present invention, when viewed from the axial end portion of the stator. FIG. 34 illustrates a case where each wave winding of the stator of the above-mentioned first embodiment is divided into four parts, and the numbers of slots of the division units are Q1, Q2, Q3, and Q4, respectively. Further, the number of series turns in the Qn slots (n is a positive integer) Nn is Qn×(the number of series conductor wires)/2.

In this case, the number of slots has relationships of Q1=Q3 and Q2=Q4, and by setting the same number of series conductor wires with respect to the corresponding number of slots, the number of series turns with respect to the corresponding number of slots has relationships of N1=N3 and N2=N4.

Therefore, parts having the same number of series turns corresponding to the number of slots in which the divided wave winding is provided are arranged so as to be symmetrical about a stator central point, and hence the electromagnetic excitation force caused by the generated magnetomotive force can be balanced with respect to the stator center. With this, the vibration noise of the rotary electric machine can be reduced.

Note that, in the above-mentioned third embodiment, the wave winding of the stator is not limited to that divided into four parts, and may be divided into n=2m (m is a positive integer) parts. Also in this case, the effects similar to those of the above-mentioned third embodiment can be obtained.

Fourth Embodiment

Figure 35:
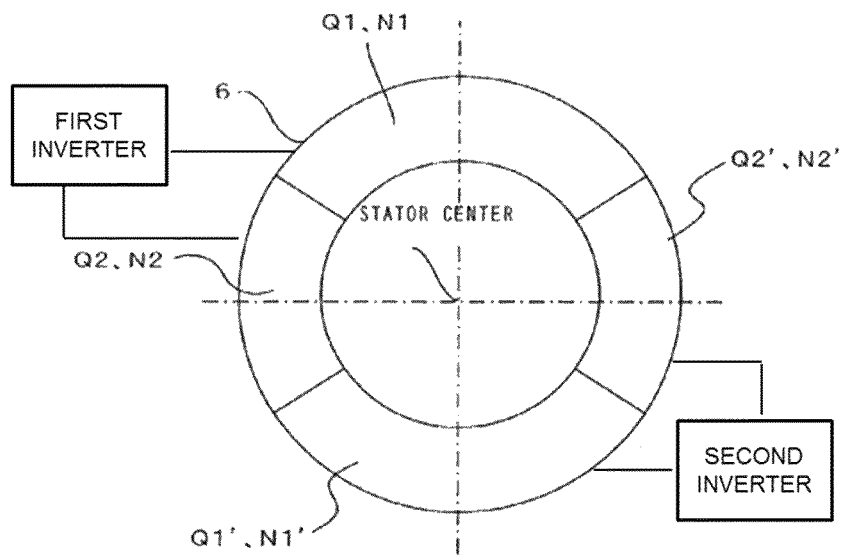
FIG. 35 is a schematic diagram illustrating a division state of a wave winding in a fourth embodiment of the present invention, when viewed from an axial end portion of a stator.

FIG. 35 is a schematic diagram illustrating a division state of a wave winding in a fourth embodiment of the present invention, when viewed from the axial end portion of the stator. FIG. 35 is different from FIG. 34 illustrating the third embodiment in that a divided wave winding to be mounted into Qn' slots (n is a positive integer) is driven by an inverter different from an inverter that drives the divided wave winding to be mounted into the Qn slots, and those wave windings are not electrically connected to each other in the rotary electric machine. As for the numbers of slots of the four divided parts, Q1' is set instead of Q3 and Q2' is set instead of Q4. As a result, the number of slots has relationships of Q1=Q1' and Q2=Q2', and by setting the same number of series conductor wires with respect to the corresponding number of slots, the number of series turns with respect to the corresponding number of slots has relationships of N1=N1' and N2=N2'.

That is, the divided wave winding mounted to a certain number of slots and to be connected to one inverter and the divided wave winding mounted to the certain number of slots and to be connected to another inverter are arranged so as to be symmetrical about the stator central point. Therefore, the electromagnetic excitation force formed by the winding connected to at least one inverter can be balanced with respect to the stator center by the electromagnetic excitation force formed by the winding connected to the remaining inverter. With this, the vibration noise of the rotary electric machine can be reduced without increasing the number of divisions in the circumferential direction per one inverter.

Figure 36:
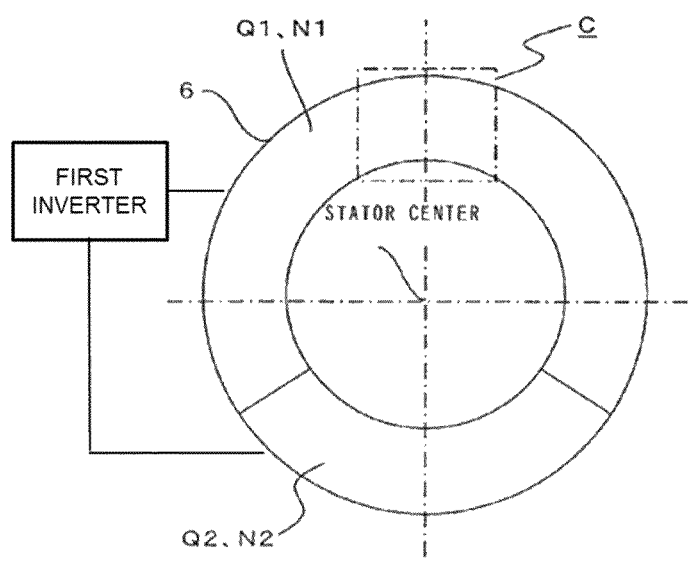
FIG. 36 is a schematic diagram illustrating a division state of a wave winding to be mounted to Qn slots in the fourth embodiment of the present invention, when viewed from the axial end portion of the stator.
Figure 37:
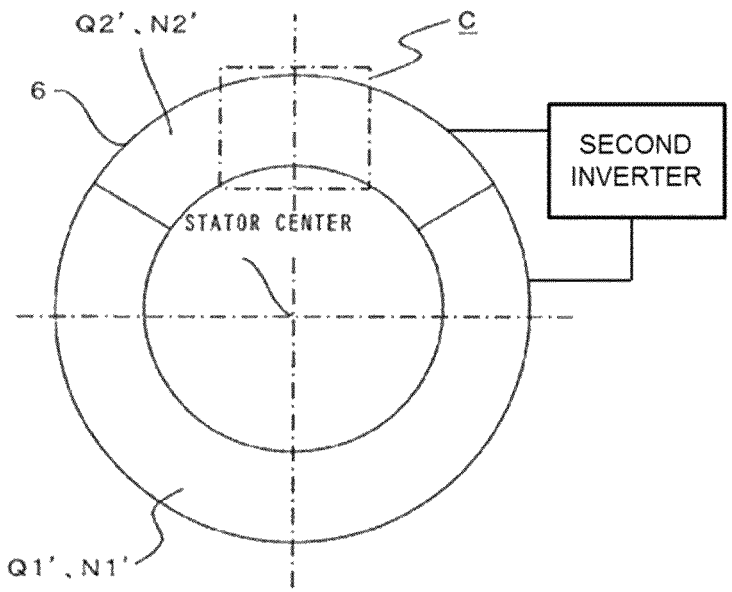
FIG. 37 is a schematic diagram illustrating a division state of a wave winding to be mounted to Qn' slots in the fourth embodiment of the present invention, when viewed from the axial end portion of the stator.
Figure 38:
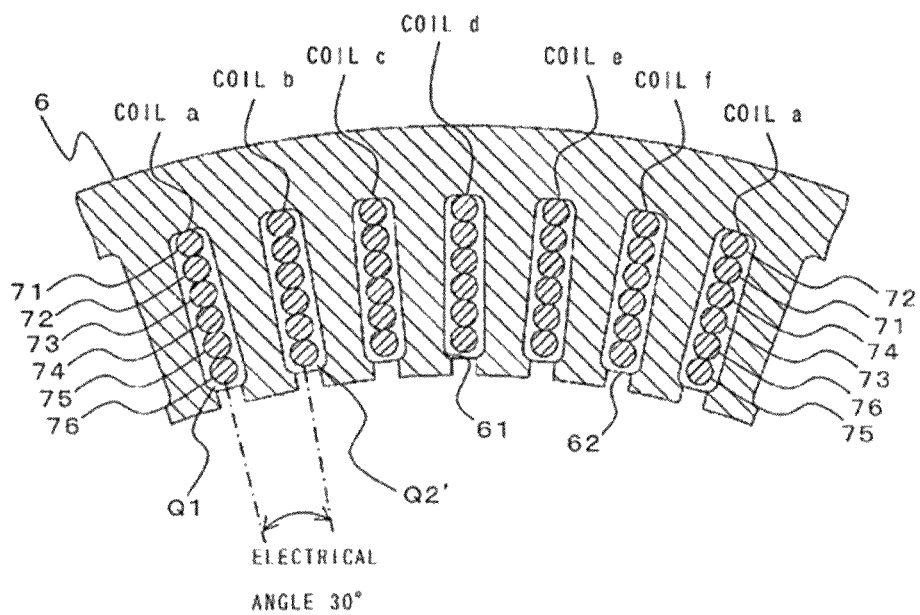
FIG. 38 is an enlarged view illustrating the part C of FIGS. 36 and 37.

FIG. 36 is a schematic diagram illustrating a division state of the wave winding to be mounted to the Qn slots in the fourth embodiment of the present invention, when viewed from the axial end portion of the stator. FIG. 37 is a schematic diagram illustrating a division state of the wave winding to be mounted to the Qn' slots in the fourth embodiment of the present invention, when viewed from the axial end portion of the stator. FIG. 38 is an enlarged view illustrating the part C of FIGS. 36 and 37.

In FIGS. 36 to 38, the wave winding mounted to each of the Q1 slots and the Q2 slots, and the wave winding connected to an inverter different from that of the above-mentioned wave winding, which is mounted to each of the Q2' slots and the Q1' slots, are arranged in slots 61 whose circumferential positions are shifted from each other by an electrical angle of 30°.

Further, FIGS. 36 to 38 are different from FIG. 35 in that the wave winding mounted to each of the Q1 slots and the Q2 slots and the wave winding mounted to each of the Q1' slots and the Q2' slots are arranged so as to be substantially symmetrical about the stator central point.

That is, the divided wave winding mounted to a certain number of slots and to be connected to one inverter and the divided wave winding mounted to the certain number of slots and to be connected to another inverter are arranged so as to be substantially symmetrical about the stator central point. Therefore, the electromagnetic excitation force formed by the winding connected to at least one inverter can be balanced with respect to the stator center by the electromagnetic excitation force formed by the winding connected to the remaining inverter. With this, the vibration noise of the rotary electric machine can be reduced without increasing the number of divisions in the circumferential direction per one inverter.

Further, in the fourth embodiment of the present invention, driving is performed by a plurality of inverters when the power supply voltage is constant. In this case, as compared to the case where driving is performed by one inverter, it is possible to further reduce the number of slots required for each number of series turns of a certain phase, and to increase the number of conductor wires per slot. Therefore, the dimension of one conductor wire can be reduced. Thus, the winding workability can be improved.

Further, similarly to the above-mentioned second embodiment, even when the stator core is divided, as described above, it is possible to drive the rotary electric machine by the plurality of inverters. Therefore, in addition to the above-mentioned effects, it is possible to improve workability when the winding is mounted to the stator core.

Note that, the above-mentioned fourth embodiment describes an example of an electric motor in which the wave winding is connected to an inverter, but the present invention is not limited thereto. The wave winding may be connected to a rectifier instead of an inverter. Thus, even when the rotary electric machine is used as a generator, similarly to the above-mentioned case, the effect of balancing the electromagnetic excitation force generated by the winding can be obtained.

Further, FIG. 36 illustrates an example in which the circumferential positions of the Q1 slots and the Q2' slots are shifted by an electrical angle of 30°, but the present invention is not limited thereto. The electrical angle of adjacent slots of a certain phase may be arbitrary. When the divided wave winding mounted to the Qn slots and the divided wave winding mounted to the Qn' slots, which are connected to different inverters, respectively, are arranged so as to be substantially symmetrical about the stator central point so that the number of series turns has a relationship of Nn=Nn', the effects similar to those of the above-mentioned fourth embodiment can be obtained.

What is claimed is:

1. A rotary electric machine, comprising:
a stator comprising three-phase AC windings; and
a field pole rotor,
wherein the stator comprises:
   a stator core provided with a plurality of slots arranged in a circumferential direction at predetermined pitches; and
   a coil of each phase, which comprises N conductor wires, where N is a positive integer of 2 or more, which are bent back on an outer side of an axial end surface of the stator core, the coil being mounted in the plurality of slots at predetermined slot pitches, and
wherein the coil is configured so that:
   the N conductor wires of wave windings each divided at at least two positions in the circumferential direction are provided in one of the plurality of slots;
   within a unit of the divided wave windings in which conduction is made, the N conductor wires are connected in one of series and parallel to each other at division positions located at substantially the same circumferential position of conductor-wire end portions;

in the each phase, division units of the divided wave windings are connected in series to each other, wherein the divided wave windings are each mounted to a part of all the slots provided in the entire rotary electric machine and are each mounted to respectively different parts of the slots, and a total number of series turns of the series-connected division units of the each phase is a predetermined number of series turns, which does not exceed an upper limit value of a terminal voltage of the rotary electric machine; and the series-connected division units of the each phase have the same total number of series turns.

2. A rotary electric machine according to claim 1,
wherein a number of the wave windings provided in the same slot is N=2M, where M is a positive integer,
wherein the wave windings comprise sets of two conductor wires having coil end parts located out of the plurality of slots, the coil end parts of each set being located on different sides in an axial direction of the stator core from each other but at substantially the same circumferential position, and
wherein the wave windings comprise conductor wires connected to a high voltage side and a low voltage side of a power source, respectively, the conductor wires having division positions located at substantially the same circumferential position.

3. A rotary electric machine according to claim 2, wherein the divided wave windings provided in the same number of slots are arranged so as to be symmetrical about a stator central point.

4. A rotary electric machine according to claim 2,
wherein the rotary electric machine is driven by a plurality of inverters,
wherein the three-phase AC windings connected to the respective plurality of inverters are prevented from being electrically connected to each other in the rotary electric machine, and
wherein a divided wave winding provided in a certain number of slots and to be connected to one of the plurality of inverters and a divided wave winding provided in the certain number of slots and to be connected to another of the plurality of inverters are arranged so as to be symmetrical about a stator central point.

5. A rotary electric machine according to claim 2,
wherein the wave windings are each divided at two positions in the circumferential direction, and
wherein the stator core is divided at one position.

6. A rotary electric machine according to claim 5,
wherein the rotary electric machine is driven by a plurality of inverters,
wherein the three-phase AC windings connected to the respective plurality of inverters are prevented from being electrically connected to each other in the rotary electric machine, and
wherein a divided wave winding provided in a certain number of slots and to be connected to one of the plurality of inverters and a divided wave winding provided in the certain number of slots and to be connected to another of the plurality of inverters are arranged so as to be symmetrical about a stator central point.

7. A rotary electric machine according to claim 1,
wherein a number of the wave windings provided in the same slot is N=2M, where M is a positive integer,
wherein the wave windings comprise sets of two conductor wires having coil end parts located out of the plurality of slots, the coil end parts of each set being located on different sides in an axial direction of the stator core from each other but at substantially the same circumferential position, and
wherein the wave windings comprise conductor wires connected to a high voltage side and a low voltage side of a power source, respectively, the conductor wires having division positions located on different sides in the circumferential direction from each other.

8. A rotary electric machine according to claim 7,
wherein the coil is divided at at least one position in the circumferential direction,
wherein within the unit of the divided wave windings in which the conduction is made, at division positions located at substantially the same circumferential position of the conductor-wire end portions, all of the N conductor wires are each connected in parallel to at least one another conductor wire, and
wherein two conductor wires within the division unit are connected to each other at one substantial end portion and another substantial end portion of the division positions.

9. A rotary electric machine according to claim 7, wherein the divided wave windings provided in the same number of slots are arranged so as to be symmetrical about a stator central point.

10. A rotary electric machine according to claims 7,
wherein the rotary electric machine is driven by a plurality of inverters,
wherein the three-phase AC windings connected to the respective plurality of inverters are prevented from being electrically connected to each other in the rotary electric machine, and
wherein a divided wave winding provided in a certain number of slots and to be connected to one of the plurality of inverters and a divided wave winding provided in the certain number of slots and to be connected to another of the plurality of inverters are arranged so as to be symmetrical about a stator central point.

11. A rotary electric machine according to claim 7,
wherein the wave windings are each divided at two positions in the circumferential direction, and
wherein the stator core is divided at one position.

12. A rotary electric machine according to claim 11,
wherein the rotary electric machine is driven by a plurality of inverters,
wherein the three-phase AC windings connected to the respective plurality of inverters are prevented from being electrically connected to each other in the rotary electric machine, and
wherein a divided wave winding provided in a certain number of slots and to be connected to one of the plurality of inverters and a divided wave winding provided in the certain number of slots and to be connected to another of the plurality of inverters are arranged so as to be symmetrical about a stator central point.

13. A rotary electric machine according to claim 1,
wherein a number of the wave windings provided in the same slot is N=2M, where M is a positive integer,
wherein the wave windings comprise sets of two conductor wires having coil end parts located out of the plurality of slots, the coil end parts of each set being located on different sides in an axial direction of the stator core from each other but at substantially the same circumferential position, and wherein the wave windings comprise:
  division units having conductor wires connected to a high voltage side and a low voltage side of a power source, respectively, the conductor wires having division positions located at substantially the same circumferential position; and
  division units having conductor wires connected to the high voltage side and the low voltage side of the power source, respectively, the conductor wires having division positions located on different sides in the circumferential direction from each other.

14. A rotary electric machine according to claim 13, wherein the divided wave windings provided in the same number of slots are arranged so as to be symmetrical about a stator central point.

15. A rotary electric machine according to claim 13,
  wherein the rotary electric machine is driven by a plurality of inverters,
  wherein the three-phase AC windings connected to the respective plurality of inverters are prevented from being electrically connected to each other in the rotary electric machine, and
  wherein a divided wave winding provided in a certain number of slots and to be connected to one of the plurality of inverters and a divided wave winding provided in the certain number of slots and to be connected to another of the plurality of inverters are arranged so as to be symmetrical about a stator central point.

16. A rotary electric machine according to claim 13,
  wherein the wave windings are each divided at two positions in the circumferential direction, and
  wherein the stator core is divided at one position.

17. A rotary electric machine according to claim 16,
  wherein the rotary electric machine is driven by a plurality of inverters,
  wherein the three-phase AC windings connected to the respective plurality of inverters are prevented from being electrically connected to each other in the rotary electric machine, and
  wherein a divided wave winding provided in a certain number of slots and to be connected to one of the plurality of inverters and a divided wave winding provided in the certain number of slots and to be connected to another of the plurality of inverters are arranged so as to be symmetrical about a stator central point.

18. A rotary electric machine according to claim 1,
  wherein the coil is divided at at least one position in the circumferential direction, and
  wherein within the unit of the divided wave windings in which the conduction is made, conductor wires connected in series and conductor wires connected in parallel to each other at division positions located at substantially the same circumferential position of the conductor-wire end portions are connected in series to each other.

19. A rotary electric machine, comprising:
  a stator comprising three-phase AC windings; and
  a field pole rotor,
  wherein the stator comprises:
    a stator core provided with a plurality of slots arranged in a circumferential direction at predetermined pitches; and
    a coil of each phase, which comprises N conductor wires, where N is a positive integer of 2 or more, which are bent back on an outer side of an axial end surface of the stator core, the coil being mounted in the plurality of slots at predetermined slot pitches, and
  wherein the coil is configured so that:
    the N conductor wires of wave windings each divided at at least one position in the circumferential direction are provided in one of the plurality of slots;
    in cases where wave windings are divided at at least two positions in the circumferential direction, in the each phase, division units of the divided wave windings are connected in series to each other, wherein the divided wave windings are each mounted to a part of all the slots provided in the entire rotary electric machine and are each mounted to respectively different parts of the slots, and a total number of series turns of the series-connected division units of the each phase is a predetermined number of series turns, which does not exceed an upper limit value of a terminal voltage of the rotary electric machine;
    in cases where wave windings are divided at one position in the circumferential direction, a total number of series turns of the division units of the each phase is a predetermined number of series turns, which does not exceed an upper limit value of a terminal voltage of the rotary electric machine;
    the series-connected division units of the each phase have the same total number of series turns; and
    within a unit of the divided wave windings in which conduction is made, all of the conductor wires are connected in series to each other at both conductor-wire end portions.

20. A rotary electric machine, comprising:
  a stator comprising three-phase AC windings; and
  a field pole rotor,
  wherein the stator comprises:
    a stator core provided with a plurality of slots arranged in a circumferential direction at predetermined pitches; and
    a coil of each phase, which comprises N=2M conductor wires, where M is a positive integer of 2 or more, which are bent back on an outer side of an axial end surface of the stator core, the coil being mounted in the plurality of slots at predetermined slot pitches, and
  wherein the coil is configured so that:
    the N conductor wires of wave windings each divided at at least one position in the circumferential direction are provided in one of the plurality of slots;
    in cases where wave windings are divided at at least two positions in the circumferential direction, in the each phase, division units of the divided wave windings are connected in series to each other, wherein the divided wave windings are each mounted to a part of all the slots provided in the entire rotary electric machine and are each mounted to respectively different parts of the slots, and a total number of series turns of the series-connected division units of the each phase is a predetermined number of series turns, which does not exceed an upper limit value of a terminal voltage of the rotary electric machine;
    in cases where wave windings are divided at one position in the circumferential direction, a total number of series turns of the division units of the each phase is a predetermined number of series turns, which does not exceed an upper limit value of a terminal voltage of the rotary electric machine;
    the series-connected division units of the each phase have the same total number of series turns; and
    within a unit of the divided wave windings in which conduction is made, one conductor wires which is half of all of the conductor wires and the other conductor wires which is remaining half of all of the conductor wires are respectively connected in parallel at both conductor-wire end portions, wherein one conductor wires and the other conductor wires are connected in series to each other.

* * * * *